United States Patent
Alameh et al.

(10) Patent No.: US 11,093,262 B2
(45) Date of Patent: Aug. 17, 2021

(54) ELECTRONIC DEVICES AND CORRESPONDING METHODS FOR SWITCHING BETWEEN NORMAL AND PRIVACY MODES OF OPERATION

(71) Applicant: Motorola Mobility LLC, Chicago, IL (US)

(72) Inventors: Rachid Alameh, Crystal Lake, IL (US); Zhengping Ji, Hinsdale, IL (US)

(73) Assignee: Motorola Mobility LLC, Chicago, IL (US)

( * ) Notice: Subject to any disclaimer, the term of this patent is extended or adjusted under 35 U.S.C. 154(b) by 71 days.

(21) Appl. No.: 16/525,162

(22) Filed: Jul. 29, 2019

(65) Prior Publication Data

US 2021/0034384 A1  Feb. 4, 2021

(51) Int. Cl.
| | |
|---|---|
| *G06F 9/451* | (2018.01) |
| *G06F 21/54* | (2013.01) |
| *G06F 3/16* | (2006.01) |

(52) U.S. Cl.
CPC .............. *G06F 9/451* (2018.02); *G06F 3/167* (2013.01); *G06F 21/54* (2013.01)

(58) Field of Classification Search
CPC ........... G06F 9/451; G06F 21/54; G06F 3/167
See application file for complete search history.

(56) References Cited

U.S. PATENT DOCUMENTS

| | | | |
|---|---|---|---|
| 8,594,374 | B1 | 11/2013 | Bozarth |
| 9,274,599 | B1 | 3/2016 | D'Amico et al. |
| 10,063,677 | B2 | 8/2018 | Cavallaro et al. |
| 2002/0138767 | A1 | 9/2002 | Hamid |

(Continued)

FOREIGN PATENT DOCUMENTS

| | | |
|---|---|---|
| CN | 104850769 | 8/2015 |
| EP | 2793214 | 10/2014 |

(Continued)

OTHER PUBLICATIONS

Balduaf, Matthias et al., "KIBITZER: A wearable System for Eye-Gaze-based Mobile Urban Exploration", Published at Augmented hUman Conference; Apr. 2-3, 2010; Available online http://matthiasbaldauf.com/publications/Baldauf10b.pdf, 5 pages.

(Continued)

*Primary Examiner* — Andrey Belousov
(74) *Attorney, Agent, or Firm* — Philip H. Burrus, IV

(57) ABSTRACT

An electronic device includes a user interface, a wireless communication device, and one or more processors. The wireless communication device establishes a paired communication connection with at least one companion electronic device. The wireless communication device receives one or more electronic communications from the at least one companion electronic device. The one or more processors determine, from the one or more electronic communications, whether an environment of the electronic device is a public environment or a private environment. Where the environment is the private environment, the one or more processors cause the user interface of the electronic device to enter a normal mode of operation. Where the environment is the public environment, the one or more processors cause the user interface of the electronic device to enter a privacy mode of operation.

20 Claims, 8 Drawing Sheets

(56) References Cited

U.S. PATENT DOCUMENTS

| | | | |
|---|---|---|---|
| 2003/0172283 | A1 | 9/2003 | O'Hara |
| 2007/0057935 | A1 | 3/2007 | Takagi |
| 2007/0171921 | A1 | 7/2007 | Wookey |
| 2008/0238610 | A1 | 10/2008 | Rosenberg |
| 2009/0240940 | A1 | 9/2009 | Shoemake et al. |
| 2011/0312311 | A1 | 12/2011 | Abifaker et al. |
| 2012/0283894 | A1* | 11/2012 | Naboulsi .......... A61B 5/18 701/1 |
| 2013/0076663 | A1 | 3/2013 | Sirpal et al. |
| 2014/0028435 | A1 | 1/2014 | Brockway, III |
| 2014/0098095 | A1 | 4/2014 | Lee |
| 2014/0118317 | A1 | 5/2014 | Song et al. |
| 2014/0160337 | A1 | 6/2014 | Van Den Herik |
| 2014/0306985 | A1 | 10/2014 | Jeong |
| 2014/0320274 | A1 | 10/2014 | De Schepper et al. |
| 2014/0350883 | A1 | 11/2014 | Carter et al. |
| 2015/0022515 | A1 | 1/2015 | Ikeda et al. |
| 2015/0042674 | A1 | 2/2015 | Lin |
| 2015/0081559 | A1 | 3/2015 | Dua |
| 2015/0146387 | A1 | 5/2015 | Lee |
| 2015/0163221 | A1 | 6/2015 | Bolin et al. |
| 2015/0177789 | A1 | 6/2015 | Jinbo |
| 2015/0186636 | A1 | 7/2015 | Tharappel |
| 2015/0227223 | A1 | 8/2015 | Kang et al. |
| 2015/0286813 | A1 | 10/2015 | Jakobsson |
| 2015/0301672 | A1 | 10/2015 | Kim et al. |
| 2015/0338916 | A1 | 11/2015 | Priyantha et al. |
| 2015/0348453 | A1 | 12/2015 | Jin et al. |
| 2015/0358315 | A1 | 12/2015 | Cronin |
| 2016/0019423 | A1 | 1/2016 | Ortiz et al. |
| 2016/0021168 | A1 | 1/2016 | Chaudhri et al. |
| 2016/0034029 | A1 | 2/2016 | Lyons et al. |
| 2016/0057139 | A1 | 2/2016 | McDonough |
| 2016/0267732 | A1 | 9/2016 | Agrfioti et al. |
| 2016/0269403 | A1 | 9/2016 | Koutenaei et al. |
| 2017/0017313 | A1 | 1/2017 | Rakshit |
| 2017/0126680 | A1* | 5/2017 | Yusuf .......... H04W 4/80 |
| 2017/0177096 | A1 | 6/2017 | Cheong et al. |
| 2017/0185289 | A1 | 6/2017 | Kim |
| 2017/0318019 | A1 | 11/2017 | Gordon et al. |
| 2017/0323158 | A1 | 11/2017 | Gordon |
| 2017/0345365 | A1 | 11/2017 | Li |
| 2018/0020349 | A1 | 1/2018 | Tyagi |
| 2018/0165473 | A1* | 6/2018 | Debickes .......... H04L 63/0272 |
| 2019/0007385 | A1 | 1/2019 | Agrawal |

FOREIGN PATENT DOCUMENTS

| | | |
|---|---|---|
| WO | 2015/187504 | 12/2015 |
| WO | 2015/195011 | 12/2015 |

OTHER PUBLICATIONS

Gee, Jason , "Final Office Action", U.S. Appl. No. 15/209,534, filed Jul. 13, 2016; dated Dec. 13, 2018, 22 pages.

Gee, Jason Kai Yin , "NonFinal OA", U.S. Appl. No. 15/209,524, filed Jul. 13, 2016; dated Jul. 6, 2018, 19 pages.

Hauber, Jorg , "European Search Report", European Application No. EP 17179859; Reference No. MM02017-EP-NP; dated Oct. 9, 2017, 9 pages.

Kanaan, Simon , "NonFinal OA", U.S. Appl. No. 15/209,514, filed Jul. 13, 2016; dated Apr. 2, 2018, 25 pages.

Kanaan, Simon , "NonFinal Office Action", U.S. Appl. No. 15/209,514, filed Jul. 13, 2016; dated Dec. 13, 2018, 19 pages.

Kanaan, Simon , "Notice of Allowance", U.S. Appl. No. 15/209,514, filed Jul. 13, 2016; dated May 20, 2019, 14 pages.

Karam, Tony , "Passwords: Make Way for Proximity Authentication", Published online on Mar. 2, 2018 at https://www.technative.io/passwords-make-way-for-proximity-authentication/, 4 pages.

Morris, Euros , "GB Search Report and Written Opinion", GB Application No. GB1710801.0; Reference No. MM02057-GB-NP; dated Dec. 20, 2017; Search Date Dec. 18, 2017, 9 pages.

Rashid, Harunur , "Final Office Action", U.S. Appl. No. 15/209,530, filed Jul. 13, 2016; dated Aug. 23, 2018, 26 pages.

Rashid, Harunur , "NonFinal OA", U.S. Appl. No. 15/209,530, filed Jul. 13, 2016; dated Feb. 22, 2018, 20 pages.

Rashid, Harunur , "Notice of Allowance", U.S. Appl. No. 15/209,530, filed Jul. 13, 2016; dated Jan. 25, 2019, 10 pages.

Saddington, Aaron , "GB Search and Written Opinion", GB Application No. GB1710820.0; Reference No. MM02072-GB-NP; dated Dec. 19, 2017, 6 pages.

Tran, Kim Than Thi , "Final Office Action", U.S. Appl. No. 15/209,519, filed Jul. 13, 2016; dated May 8, 2018, 27 pages.

Tran, Kim Thanh Thi , U.S. Appl. No. 15/209,527, filed Jul. 13, 2016; dated Dec. 12, 2017, 19 pages.

Tran, Kim Thanh Thi , "Final OA", U.S. Appl. No. 15/209,519, filed Jul. 13, 2016; dated Aug. 27, 2018, 28 pages.

Tran, Kim Thanh Thi , "Final OA", U.S. Appl. No. 15/209,527, filed Jul. 13, 2016; dated Jul. 12, 2018, 27 pages.

Tran, Kim Thanh Thi , "Final Office Action", U.S. Appl. No. 15/209,519, filed Jul. 13, 2016; dated Mar. 5, 2019, 34 pages.

Tran, Kim Thanh Thi , "NonFinal OA", U.S. Appl. No. 15/209,519, filed Jul. 13, 2017, dated Oct. 17, 2017, 20 pages.

Zanglein, Ulrike , "PCT Search Report", PCT/US2017/041435; International Filing Date Jul. 11, 2017; dated Sep. 21, 2017, 13 pages.

Nield, David , "Change Your Android Phone's Setting Based on Where You Are", Gizmodo; Published Jul. 1, 2014 online at https://gizmodo.com/change-your-android-phones-settings-based-on-where-you-1597903597, 8 pages.

Thomas, Dallas , "Mirror & Control Your Android's Screen on Your Windows PC", Gadget Hacks; Published Dec. 12, 2016 online at https://android.gadgethacks.com/how-to/mirror-control-your-androids-screen-your-windows-pc-0175404/, 6 pages.

Apple Inc, , "Getting Started with iBeacon", Version 1.0, Jun. 2, 2014, pp. 1-11, taken from https://developer.apple.com/ibeacon/Getting-Started-with-iBeacon.pdf.

Blackstone, Austin , "Understanding the Different Types of BLE Beacons", Mar. 24, 2015, p. 106, https://os.mbed.com/blog/entry/BLE-Beacons-URIBeacon-AltBeacons-IBeacon/,.

Ho, Thomas, "Notice of Allowance", Filed Sep. 9, 2019, dated May 19, 2021.

* cited by examiner

ELECTRONIC DEVICES AND CORRESPONDING METHODS FOR SWITCHING BETWEEN NORMAL AND PRIVACY MODES OF OPERATION

BACKGROUND

Technical Field

This disclosure relates generally to electronic devices, and more particularly to electronic devices having multiple modes of operation.

Background Art

Portable electronic devices, such as smartphones, tablet computers, and wearable electronic devices, are becoming ubiquitous in modern society. Many people today own a smart phone or other wireless communication device with which they communicate with friends, workers, and family, manage calendars, purchase goods and services, listen to music, watch videos, play games, and surf the Internet.

As the technology associated with these devices has advanced, so too has their feature set. Users can send text messages, multimedia messages, execute financial transactions, watch movies and television shows, listen to music, store and analyze medical information, store large photo galleries, maintain calendars, to-do, and contact lists, and even perform personal assistant functions.

Many of these functions require the entry, storage, and retrieval of "private" data about the user. Such data can include their location, financial information, medical information, personal identifiers such as Social Security numbers, and activity history, e.g., travels, purchases, contacts, and so forth. With all of this information stored in an electronic device, it can be desirable to prevent unauthorized persons from accessing this data. It would be advantageous to have an improved electronic device that works to protect the exposure of private data.

Figure 1:
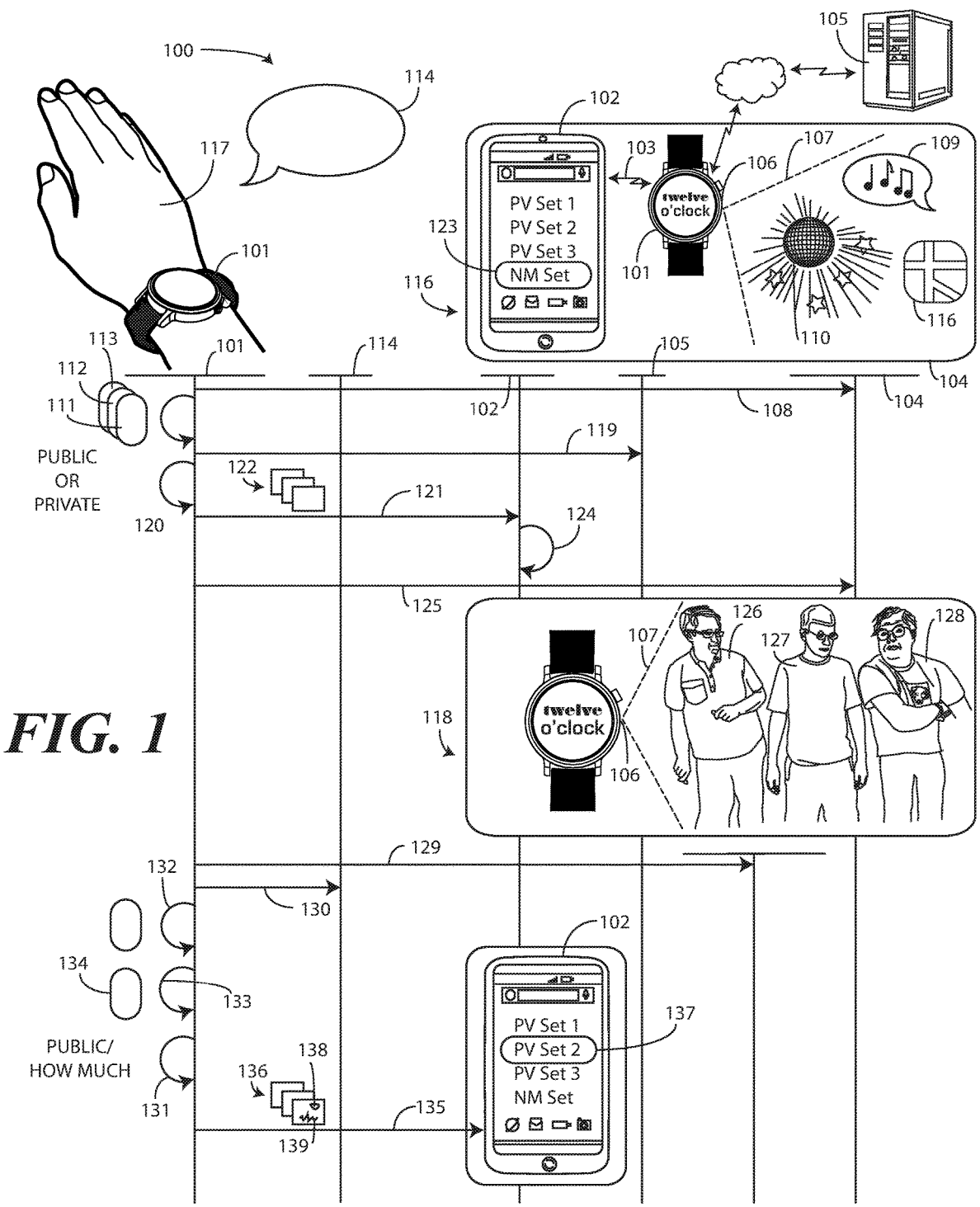
FIG. 1 illustrates one or more explanatory system and method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to determining, from sensor data, whether an electronic device is in a public setting or private setting, and causing the electronic device to either enter a normal mode of operation or a privacy mode of operation, which may be one privacy mode of operation selected from a plurality of privacy modes of operation. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions determining whether an environment about an electronic device is a public environment or a private environment, and then causing the electronic device to enter either a normal mode of operation or a privacy mode of operation, as described herein. The non-processor circuits may include, but are not limited to, a radio receiver, a radio transmitter, signal drivers, clock circuits, power source circuits, and user input devices.

As such, these functions may be interpreted as steps of a method to perform the determination of whether an electronic device is in a public or private environment or setting, and thereafter causing the electronic device to enter a normal mode of operation or a privacy mode of operation that limits restricts access to at least some data stored within the electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device, which can be wearable in one or more embodiments, that operates with a companion electronic device. For instance, a smart watch can operate in tandem with a smartphone with which the smart watch has established a paired communication connection. Embodiments of the disclosure contemplate that a wearable electronic device is more frequently exposed to the environment than, say, a smartphone, which is frequently stowed within a pocket or purse. Accordingly, the sensors of the wearable device are frequently in a better position to monitor the environment than are those of the companion electronic device.

In one or more embodiments, the sensors of a wearable electronic device are used to monitor the environment so that the one or more processors of the wearable electronic device can determine whether a particular environment or setting is public or private. The sensors of the wearable electronic device can periodically sample environmental conditions, including sounds, lighting conditions, temperatures, captured images, noise levels, locations, and so forth. One or more processors of the wearable electronic device, which an include an artificial intelligence (AI) engine, then can use this sensor data to determine whether an environment around the wearable electronic device comprises a public setting or a private setting. The conclusion of whether the setting is public or private can then be communicated to the companion electronic device. In one or more embodiments, the companion electronic device receives the conclusion and adjusts its user interface accordingly to protect data stored within the companion electronic device.

In one embodiment, the wearable electronic device is the master, while the companion electronic device is the slave. In another embodiment, the wearable electronic device is the slave, and the companion electronic device is the master. In another embodiment, neither the wearable electronic device nor the companion electronic device is the master. Instead, each of the wearable electronic device and the companion electronic device form their own conclusions as to whether they are in a public setting or private setting, thereafter comparing the two conclusions to make decisions regarding which mode of operation to select.

In one or more embodiments, a wireless communication device of the wearable electronic device initially establishes a paired communication connection with the companion electronic device. Illustrating by example, in one embodiment the wearable electronic device may establish a peer-to-peer connection via a Bluetooth.sup.™ connection. In one or more embodiments, the wearable electronic device then uses one or more sensors to collect sensor data from an environment of the electronic device.

One or more processors of the wearable electronic device, which are operable with the one or more sensors, then determine, from the sensor data, whether the environment is a public environment, a private environment, or a semi-private or quasi-private environment. The one or more processors of the wearable electronic device can determine, from the sensor data, whether the electronic device should enter a privacy mode or operation or a public mode of operation.

Illustrating by example, if multiple people are within a predefined distance of the electronic device, the one or more processors can conclude that the environment is not private. Accordingly, they can conclude that the electronic device should enter a privacy mode of operation where access to at least some personal information in the electronic device is limited or restricted.

In one or more embodiments, the wearable electronic device then controls the companion electronic device, thereby causing the companion electronic device to enter the same mode of operation. For example, when the one or more processors of the wearable electronic device conclude that the wearable electronic device should enter the privacy mode of operation, in one or more embodiments the one or more processors cause the wireless communication device to transmit one or more electronic communications to the companion electronic device instructing the companion electronic device to enter the privacy mode of operation. Where the wearable electronic device is the master and the companion electronic device is the slave, these electronic communications cause the companion electronic device to enter the privacy mode of operation.

In one or more embodiments, the wearable electronic device is the "master" and uses its sensors to control the companion electronic device, which can be a smartphone, tablet, or other electronic device. Since a wearable electronic device like a smart watch is often exposed to the environment, while a companion electronic device such as a smartphone may be disposed within a pocket, making the wearable electronic device the master in accordance with embodiments of the disclosure is advantageous in that its microphones, cameras, or other sensors are positioned in an exposed location to "see" and "hear" what is going on in the environment.

As noted above, in one or more embodiments a wearable electronic device performs periodic sampling of environmental conditions with its sensors. In one or more embodiments, the wearable electronic device can also communicate with one or more "cloud" electronic devices as well. The one or more sensors of the wearable electronic device may sense sounds, lighting, temperature, noise levels, and capture images. The cloud electronic devices may provide information such as calendar information, location information, itinerary information, and so forth. The cloud electronic device may also perform analysis on the sensor data, such as determining that a particular image is that of a movie theater, bar, or restaurant.

The sensor data and/or cloud data can then be delivered to the one or more processors, which may include an AI engine. The one or more processors can then determine, in the form of a conclusion, whether the wearable electronic device is in a public setting, e.g., a restaurant, park, or movie theater, or in a private setting, e.g., in the home of the authorized user while the authorized user is alone.

In one or more embodiments, the conclusion regarding whether the wearable electronic device is in a public setting or private setting are then wirelessly communicated to the companion electronic device (or companion electronic devices) operating within the environment. In one or more embodiments, this conclusion is delivered without delivering the sensor and/or cloud data. In other embodiments, a combination of the conclusion and some or all of the sensor and/or cloud data is transmitted to the companion electronic device.

In one or more embodiments, the companion electronic device then, in response to receiving the conclusion, transitions its operating mode to a normal mode of operation or a privacy mode of operation. In one or more embodiments, the privacy mode of operation is one of a plurality of privacy modes of operation.

In another embodiment, one or more processors of the companion electronic device make their own conclusion regarding whether the companion electronic device is in a public setting or private setting. However, in one or more embodiments the one or more processors of the companion electronic device do this by accessing sensors of the wearable electronic device, and by receiving sensor data from the sensors of the wearable electronic device. As noted above, a wearable electronic device is frequently exposed to the environment around it, unlike a pocketed or purse-stowed companion electronic device. For this reason, the sensors of the wearable electronic device are situated in an advantageous position to monitor the environment, with the companion electronic device receiving better information by tapping into the sensors of the wearable electronic device to determine context than using its own.

In one or more embodiments, the companion electronic device becomes the master, but makes the determination of whether the companion electronic device is in the public setting or private setting by receiving sensor data from the sensors of the wearable electronic device. In such an embodiment, the wearable electronic device becomes a contextual beacon in that it sends sensor data to the companion electronic device. The companion electronic device then makes decisions regarding whether the environment is public or private as a function of this received sensor data, which can be received from one or a plurality of paired wearable electronic devices.

In this embodiment, a communication device of the companion electronic device receives one or more electronic communications comprising the sensor data from one or more paired electronic devices. The paired electronic devices can include wearable electronic devices or other electronic devices. The one or more processors of the companion electronic device then execute a decision operation using the sensor data from the electronic communications as inputs.

In one or more embodiments, the decision operation determines whether the companion electronic device is in the public setting or the private setting. Where or when the companion electronic device is in the private setting, the one or more processors of the companion electronic device cause the companion electronic device to enter a normal mode of operation. Where or when the companion electronic device is in the public setting, the one or more processors of the companion electronic device cause the companion electronic device to enter a privacy mode of operation.

In still another embodiment, neither the wearable electronic device nor the companion electronic device is a master. In this embodiment, both the wearable electronic device and the companion electronic device form their own conclusions, optionally using sensory data from the other device, as to whether the environment is public or private. In such an embodiment, the wearable electronic device and the companion electronic device transmit their conclusions to the other device. Each device then compares the conclusion it reached to the conclusion received from the other electronic device. Where there is a match, the wearable electronic device and the companion electronic device enter the selected mode of operation. In one or more embodiments, where there is not a match, each device presumes the public setting is occurring in an effort to err on the side of protecting personal information that may be stored in each electronic device.

Advantageously, embodiments of the disclosure offer many unique features. Illustrating by example, in one or more embodiments each of the wearable electronic device and the companion electronic device have stored therein different levels of privacy modes of operation, used when in varying levels of public environments, and a normal mode of operation that is operable in private environments. In one or more embodiments, each of the wearable electronic device and the companion electronic device further includes proximity tracking features that allow monitoring of the other device via preloaded software.

In one or more embodiments, the companion electronic device defaults to operating in a private mode of operation, i.e., assumes that the environment is a public environment, unless a conclusion—either from its own processors or received in a communication from the wearable electronic device—determines that a switch should be made to the normal mode of operation due to the environment being private. In one or more embodiments, the wearable electronic device communicates an instruction to switch to the normal mode of operation via one or more electronic communications.

As noted above, the determination of whether the environment is public or private, and thus whether the operating mode should be the privacy mode of operation (for public settings) or the normal mode of operation (for private settings) can be made when the wearable electronic device is acting as the master, the companion electronic device is acting as the master, or neither is acting as the master, in which case a voting procedure takes effect. Thus, in another embodiment each of the wearable electronic device and the companion electronic device determines whether the environment is public or private by using one or more of its own sensors, the sensors of the other electronic device, or data received from cloud electronic devices. The conclusions can then be shared. In one or more embodiments where there is disagreement regarding whether the environment is public or private, each device can default to a privacy mode of operation to err on the side of protecting information from unauthorized access.

In one or more embodiments, when the wearable electronic device is the master, it is able to assess the environment to determine whether it is public or private via its own sensors. The assessment of environment can include information received from other sensors as well. For example, when the wearable electronic device is the master, in one or more embodiments it is able to receive sensor information from sensors of the companion electronic device, in addition to its own sensors. Moreover, the wearable electronic device can retrieve information, such as the location, from one or more cloud electronic devices. Of course, combinations of these information sources can be used as well in one or more embodiments.

Thereafter, its processor(s), which may include an AI engine, can cause a wireless communication device to communicate the determination to the companion electronic device. In one or more embodiments, the companion electronic device defaults to a privacy mode of operation, i.e., it assumes it is in a public environment, until it receives the determination from the wearable electronic device. When receiving a determination that the wearable electronic device is in a private environment, in one or more embodiments the companion electronic device, automatically switches to a private mode of operation in response to receiving the electronic communication from the paired, wearable electronic device.

In one or more embodiments, the privacy mode of operation is one of a plurality of privacy modes of operation. Embodiments of the disclosure contemplate that when an electronic device is not in a private setting, not all public settings are the same. Illustrating by example, there may be multiple people within the environment of the electronic device, but the electronic device may be able to identify two or more of them as authorized users of the electronic device. In another example, there may be multiple people within the environment of the electronic device, but those other than the authorized user of the electronic device may be far away, and so forth.

Accordingly, in one or more embodiments the privacy mode of operation is selected from a plurality of privacy modes of operation, with each privacy mode of operation of the plurality of privacy modes of operation allowing access to different amounts of the user data. Where this is the case and the wearable electronic device is the master, in one or more embodiments the one or more electronic communications delivered from the wearable electronic device to the companion electronic device instruct the one or more processors of the companion electronic device as to which privacy mode of operation of the plurality of privacy modes of operation to enter. The companion electronic device can then automatically switch between layers of privacy modes of operation.

In addition to, or instead of, determining whether the environment is public or private from sensors and or the cloud, in one or more embodiments the wearable electronic device passively monitors conversations within the environment with speech recognition to determine whether there is a need for privacy. In one or more embodiments, the wearable electronic device includes an audio input/processor comprising hardware, executable code, and speech monitor executable code that is operable with one or more basic speech models, trained speech models, or other modules stored in memory. This audio input/processors can then to receive and identify speech using a voice recognition engine that assesses the speech to determine its context. Thus, if a user says, "Hey, device, I am not alone," in one or more embodiments the one or more processors of the wearable electronic device can conclude that the environment is public, and so forth.

Turning now to FIG. 1, illustrated therein is one explanatory system 100 and method for selecting between a public mode of operation and a privacy mode of operation in accordance with one or more embodiments of the disclosure. As illustrated in FIG. 1, an electronic device, shown as a wearable electronic device 101 configured as a smart watch, is paired via a paired communication connection 103 with a companion electronic device 102, shown here as a smartphone for illustration purposes.

In the illustrative embodiment of FIG. 1, the wearable electronic device 101 and the companion electronic device 102 are operating within an environment 104. In one or more embodiments, the environment 104 is defined by a predefined environment that can be monitored by one or more sensors of one or both of the wearable electronic device 101 and/or the companion electronic device 102. Illustrating by example, where the one or more sensors include an imager, the environment 104 may be defined by an area within which the imager can capture images, e.g., a room, hallway, public park, or train car. If the one or more sensors include an audio capture device, the environment 104 may be the interior of a building. If the one or more sensors include thermal sensors, the boundary of the environment 104 may be defined by a distance within which the thermal sensors can detect infrared energy, and so forth.

In another embodiment, the environment 104 is a predefined environment defined by distances at which a third party can hear audio emanating from the wearable electronic device 101 or the companion electronic device 102, distances at which the third party can read text presented on a user interface of the wearable electronic device 101 or the companion electronic device 102, or combinations thereof. Other techniques for defining the environment will be obvious to those of ordinary skill in the art having the benefit of this disclosure. For example, in another embodiment an authorized user may be able to apply settings to the wearable electronic device 101 or the companion electronic device 102 to define boundaries of the environment 104.

In one or more embodiments, the wearable electronic device 101 comprises a wireless communication device that establishes the paired communication connection 103 with the companion electronic device 102. It should be noted that while one companion electronic device 102 is shown in FIG. 1 for ease of illustration, in other embodiments, one or both of the wearable electronic device 101 and/or the companion electronic device 102 can establish a paired communication connection 103 with any number of other electronic devices.

Additionally, it should be noted that "companion" electronic device, as used herein, refers to an electronic device in communication with an electronic device under discussion, and more particularly in communication via a paired communication connection in some embodiments. Thus, in the illustrative embodiment of FIG. 1, when discussing the operation of the wearable electronic device 101, the smartphone would be the companion electronic device 102 to the wearable electronic device 101. However, when discussing the operation of the smartphone, the wearable electronic device 101 would be the "companion" electronic device in that context. Thus, as used herein, "companion" electronic device is used solely to distinguish one electronic device from another electronic device without necessarily requiring or implying that one electronic device is always a companion electronic device, for example.

In one or more embodiments, one or more sensors 106 of the wearable electronic device 101 monitor 108 the environment 104. In the illustrative embodiment of FIG. 1, the one or more sensors 106 of the wearable electronic device receive sensor data 107 from the environment 104. Examples of the sensor data 107 include sounds 109, ambient lighting conditions 110, temperature 111, captured images 112, noise levels 113, detected speech 114, location 115, and so forth. The sensor data 107 can also include the detection of other electronic devices operating within the environment 104. Such detection can be performed by presence sensing, beacon sensing, received signal strength indicator (RSSI) assessment, or other techniques. Other examples of sensor data 107 will be described below with reference to FIG. 2 and the sensors described therein. Still other examples of sensor data will be obvious to those of ordinary skill in the art having the benefit of this disclosure.

In one or more embodiments, the wearable electronic device 101 is optionally also able to communicate 119 with one or more cloud electronic devices 105. While using one or more sensors 106 to monitor 108 the environment 104 is one way to determine whether the environment 104 is public or private, embodiments of the disclosure contemplate that it is not the only way. The wearable electronic device 101 can also communicate with one or more cloud electronic devices 105 to obtain information such as what type of business is located at a particular location, what type of devices make certain types of sounds 109 detected within the environment 104, what types of situations use the ambient lighting conditions 110 detected in the environment 104, and so forth.

One or more processors operating within the wearable electronic device 101, which are operable with the one or more sensors 106, determine 120, from the sensor data 107, and optionally from communications with the one or more cloud electronic devices 105, whether the environment 104 is a public environment or a private environment. In so doing, the one or more processors can determine, from the sensor data 107, whether the wearable electronic device 101 should enter a privacy mode of operation or a public mode of operation.

If the environment 104 is a public environment, or a quasi-public environment, or a semi-public environment, the one or more processors would determine that the wearable electronic device 101 should enter a privacy mode of operation to protect sensitive data that may be stored within the wearable electronic device 101. By contrast, if the environment 104 is a private environment, the one or more processors would determine that the wearable electronic device 101 should enter a normal mode of operation in which access to stored data is unrestricted due to environmental condition.

In one or more embodiments, a privacy mode of operation limits or restricts access to at least some information via a user interface of an electronic device. Embodiments of the disclosure contemplate that a user may not want passersby to be privy to private information annunciated from a loudspeaker or presented on the display of an electronic device. This is especially true when the audible or visible output includes an enunciation of personal information. With this unforeseen problem in mind, the methods and devices described herein function to determine whether the environment 104 around an electronic device is a public environment or a private environment.

In one or more embodiments, the private environment occurs when only one person is within the environment 104. For example, at time 116, the environment 104 is a private environment in that only the authorized user 117 is within the environment 104. In one or more embodiments, the public environment occurs when two or more persons are within the environment 104, such as the case at time 118.

Embodiments of the disclosure contemplate that an environment 104 can be quasi-private or semi-private as well. Illustrating by example, if two or more persons are within the environment 104, but they can be identified, this can constitute a semi-private or quasi-private environment. If, for example, the authorized user 117 of the wearable electronic device 101 is the father of a family, and he is sitting in the living room with his wife and children, that environment would be quasi-private or semi-private. Information that would not be appropriate for strangers may be delivered by the user interface of the wearable electronic device 101, but other information may be limited. If the father is planning a surprise party for his wife, and has designated text messages, email, and voice messages referencing the party as private information, the wearable electronic device 101 may refrain from audibly or visibly delivering such information when operating in a privacy mode of operation in a semi-private or quasi-private environment, and so forth.

Since the environment 104 can take on various forms of "publicness," in one or more embodiments the privacy mode can be selected from a plurality of privacy modes, three examples of which are shown on the display of the companion electronic device 102 in FIG. 1. In one or more embodiments, the privacy mode of operation comprises one privacy mode of operation selected from a plurality of privacy modes of operation. In one or more embodiments, each privacy mode of operation of the plurality of privacy modes of operation allows access to different amounts of the user data. Thus, when in a first privacy mode of operation selected for a public environment, all personal data may be precluded from announcement from audible outputs or visibility on displays. By contrast, in a semi-private environment some information may be revealed while other information is restricted.

Whether one or a plurality, each privacy mode of operation can take a variety of different forms. In one embodiment, when in the privacy mode of operation the one or more processors will present an alert of incoming messages on the display, while precluding the content of messages from being presented on the display. Illustrating by example, presume the authorized user 117 is a female user who has a date with her fiancée, Buster. She may not want third parties to know the details of the date. Accordingly, when the one or more processors of the wearable electronic device 101 determine that the environment 104 is a public environment, and Buster sends a message to the authorized user 117, the display—when operating in the privacy mode—may read only "Message From Buster" while precluding the presentation of the contents of the message, e.g., "I am looking forward to our date tonight at 7 PM at Mac's Restaurant." This prevents the third party from eavesdropping into the user's affairs. Had Buster labeled, stamped, or otherwise marked the message as "private," it would not have even appeared in one embodiment when operating in the privacy mode.

In another embodiment, the one or more processors of the wearable electronic device 101 can disable the display of some or all text messages or chat messages when operating in the privacy mode of operation. In another embodiment, the one or more processors of the wearable electronic device 101 can lock the display when operating in the privacy mode of operation. For instance, if the one or more processors of the wearable electronic device 101 determine that the environment 104 is a public environment, the one or more processors could lock the wearable electronic device 101.

In yet another embodiment, the one or more processors of the wearable electronic device 101 can allow access to non-sensitive information, such as Internet search engines, while precluding access to sensitive or private information, such as electronic mail, when operating in the privacy mode of operation. For instance, the authorized user 117 may not care if a third party delivers a voice command to the wearable electronic device 101 asking it to search for the answer to the question, "How tall is the Sears Tower?" Accordingly, when in the privacy mode of operation, access to an Internet search engine may be granted so the wearable electronic device 101 can search for, and deliver, this answer. However, the authorized user 117 may not want a third party to hear the wearable electronic device 101 read electronic mail correspondence from their doctor giving a medical diagnosis. Similarly, the authorized user 117 may not want the wearable electronic device 101 to read to a third party a "Dear John" email from their significant other breaking up with them, or a communication from their significant other using expletives after the user forgot an anniversary. Accordingly, when operating in the privacy mode of operation, the one or more processors of the wearable electronic device 101 may allow access to non-sensitive applications while protecting sensitive and/or private applications.

In yet another embodiment, the one or more processors of the wearable electronic device 101 may override location sensors and beacons when operating in the privacy mode of operation. In another embodiment, the one or more processors of the wearable electronic device 101 may present or read message and electronic mail subjects only on the display, while preventing the presentation or reading of message or electronic mail content when operating in the privacy mode of operation. In another embodiment, the wearable electronic device 101 may be placed in a "no loud speak" mode where the volume of an audio output device, such as a loudspeaker, is reduced. In another embodiment, the one or more processors of the wearable electronic device 101 may lock the display of the wearable electronic device 101. In another embodiment, the one or more processors of the wearable electronic device 101 may require user entry of a PIN for access. In another embodiment, the one or more processors of the wearable electronic device 101 may present only a sneak preview of incoming messages on the display. In another embodiment, the one or more processors of the wearable electronic device 101 may not present detailed message announcements when operating in the privacy mode of operation.

In still another embodiment, the one or more processors of the wearable electronic device 101 may take other actions when operating in a privacy mode of operation. If, for example, the one or more processors of the wearable electronic device 101 determine there is a movie playing in a movie theater, in one or more embodiments the privacy mode of operation causes electronic devices to mute and switch to vibrational alerts. Similarly, if the one or more processors of the wearable electronic device 101 determine that the wearable electronic device 101 is in a loud bar, the privacy mode of operation may cause electronic devices to switch to different profiles causing a display to flash when a phone call is coming in, for example.

In yet another embodiment, the one or more processors of the wearable electronic device 101 may transition a voice control interface engine operating in the wearable electronic device 101 between a normal mode of operation and a discrete mode of operation. In one embodiment, a voice control interface engine operating in the wearable electronic device 101 is operative to receive a speech command, through a microphone, from a first distance. The voice control interface engine is then to produce, through a loudspeaker and in response to the speech command, an audible output at a first output level.

For instance, the voice control interface engine may be operable to receive voice commands from the authorized user 117 at a distance of six inches, one foot, or two feet, and may then deliver the audible output to a loudspeaker at a level sufficient for the authorized user 117 to hear it from the same distance. In one embodiment, when operating in the privacy mode, the one or more processors of the wearable electronic device 101 are operable to transition the voice control interface engine to a second mode operative to receive the speech command from a second distance and produce, in response to the speech command, the audible output at a second output level.

In one embodiment the second distance is less than the first distance and the second output level is less than the first output level. This second mode of operation, i.e., the discreet mode, allows the user to deliver voice commands with a much lower volume and receive responses at a level that others will not overhear. For instance, when in the discreet mode of operation, the user may whisper voice commands to the microphone, while hearing audible responses from an earpiece speaker rather than a loudspeaker. The examples above of privacy modes operation are illustrative only. Others will be readily obvious to those of ordinary skill in the art having the benefit of this disclosure.

In the illustrative embodiment of FIG. 1, the wearable electronic device 101 is the master, while the companion electronic device 102 is the slave. In one or more embodiments, this means that the wearable electronic device 101 and the companion electronic device 102 are each preloaded with software, which may be in the form of an application or "app" downloaded from the cloud, and which allows each of the wearable electronic device 101 and the companion electronic device 102 to transition between a normal mode of operation and one or more privacy modes of operation. Alternatively, in another embodiment each of the wearable electronic device 101 and the companion electronic device 102 are preloaded with the software to do this in the manufacturing process.

In one or more embodiments, since the wearable electronic device 101 is the master, the selection of whether to operate in the normal mode of operation or one of the privacy modes of operation for all electronic devices paired with the wearable electronic device 101 is controlled by the wearable electronic device 101. Thus, when the one or more processors of the wearable electronic device 101 determine that the wearable electronic device 101 should enter a privacy mode of operation, they cause the wireless communication device of the wearable electronic device 101 to transmit one or more electronic communications to the companion electronic device 102 instructing the companion electronic device 102 to enter a privacy mode of operation.

As shown in FIG. 1, at time 116 the environment 104 is a private environment, as only the authorized user 117 is present. Accordingly, the one or more processors of the wearable electronic device 101 determine 120 this fact and transmit 121 one or more electronic communications 122 to the companion electronic device 102 instructing the companion electronic device 102 to enter the normal mode of operation 123, also referred to as a public mode of operation.

The companion electronic device 102 receives the one or more electronic communications 122 from the wearable electronic device 101. In one or more embodiments, the companion electronic device then determines 124, from the one or more electronic communications 122, whether the environment 104 is a public environment or a private environment. Since the environment 104 is a private environment at time 116, one or more processors of the companion electronic device 102 cause the user interface of the companion electronic device 102 to enter the normal mode of operation 123, as shown in FIG. 1.

Thereafter, the wearable electronic device 101 continues to monitor 125 the environment 104. This can occur in a variety of ways. In one or more embodiments, the monitoring 125 comprises capturing audio input from the environment 104. In another embodiment, the monitoring 125 comprises capturing one or more images of the environment 104. In another embodiment, the monitoring 125 comprises using one or more proximity sensors to determine the number and placement of warm bodies within the environment 104. In still another embodiment, the monitoring 125 comprises capturing one or more depth scans of the environment 104. Of course, combinations of these techniques can be used as well. Other techniques for monitoring 125, such as receiving sensor data 107, were described above. Still other techniques for monitoring 125 the environment 104 will be obvious to those of ordinary skill in the art having the benefit of this disclosure.

At time 118, one or more persons 126,127,128 have entered the environment 104. In one or more embodiments, the one or more processors of the wearable electronic device 101 detect 129 that the environment 104 has shifted from a private setting to a public setting from the sensor data 107 received by the one or more sensors 106. The one or more sensors 106 can include imagers, depth imagers, proximity sensors, audio input devices, or any of the other sensors described below with reference to FIG. 2.

For example, the one or more processors of the wearable electronic device 101 can detect 129 that the environment 104 has shifted from the private setting to a public setting from one or more images captured by an imager. Alternatively, the one or more processors of the wearable electronic device 101 can detect 129 that the environment 104 has shifted from the private setting to a public setting by capturing audio input from the environment 104 and determining whether a single person or a plurality of persons is within the environment 104 from the audio input.

In still another embodiment, the one or more sensors 106 of the wearable electronic device 101 comprise an audio input, such as an audio input/processor, which receives 130 speech signals of detected speech 114 from the environment 104. In one or more embodiments, the one or more processors of the wearable electronic device 101 can determine 131 whether the wearable electronic device 101 should enter the privacy mode of operation or the public or normal mode of operation from the speech signals. For example, the audio input/processor can analyze 132 the speech signals or conversation in a passive listening mode to learn what the authorized user 117 and/or other persons 126,127,128 are saying and needing. Based on the conversation analysis 132, the one or more processors of the wearable electronic device 101 can determine if the type of engagement between people or with other devices needs to be private. Is the authorized user 117 is discussing medical or financial topics, for example, the one or more processors of the wearable electronic device 101 can determine that a privacy mode of operation is necessary from the analysis 132 of the speech signals of the detected speech 114, and so forth.

In one or more embodiments, when monitoring 129 the environment, the wearable electronic device 101 additionally captures 133 specific scenes 134 occurring within the environment 104. In one or more embodiments, the wearable electronic device 101 can communicate these scenes 134 with other nearby devices belonging to the authorized user 117.

These scenes 134 can also be used to determine 131 whether the environment 104 includes a public setting or a private setting. Illustrating by example, if a scene 134 is that of a movie playing in a movie theater, in one or more embodiments the one or more processors of the wearable electronic device 101 can determine 131 that the environment 104 is a public setting. Similarly, when if the scene 134 indicates that the wearable electronic device 101 is in a loud bar, the one or more processors of the wearable electronic device 101 can determine 131 that the environment 104 is a public setting, and so forth.

In one or more embodiments, the one or more processors of the wearable electronic device 101 can cause the wireless communication device to transmit 135 one or more electronic communications 136 to the companion electronic device 102 instructing the companion electronic device 102 to enter a privacy mode of operation 137. In one or more embodiments, the one or more electronic communications 136 include a control command 138 requiring the one or more processors of the companion electronic device 102 to enter the privacy mode of operation. In one or more embodiments, the one or more electronic communications 136 include a conclusion 139 identifying whether the environment 104 is a public environment or a private environment.

Where, as is the case in FIG. 1, the privacy mode of operation 137 comprises one privacy mode of operation selected from a plurality of privacy modes of operation, with each privacy mode of operation of the plurality of privacy modes of operation allowing access to different amounts of the user data, the one or more electronic communications 136 or the control command 138 can instruct the one or more processors of the companion electronic device 102 as to which privacy mode of operation of the plurality of privacy modes of operation to enter. In the illustrative embodiment of FIG. 1, since person 126 and person 127 are known, the privacy mode of operation 137 is an intermediate privacy mode since the environment is semi-public.

The companion electronic device 102 receives the one or more electronic communications 136 from the wearable electronic device 101. In one or more embodiments, the companion electronic device then determines, from the one or more electronic communications 136, whether the environment 104 is a public environment or a private environment. Since the environment 104 is now at least a semi-public environment, which is one form of a public environment, one or more processors of the companion electronic device 102 cause the user interface of the companion electronic device 102 to enter the privacy mode of operation 137.

In some embodiments, the one or more electronic communications 136 are all the information that the wearable electronic device 101 sends to the companion electronic device 102. However, in other embodiments, the wearable electronic device 101 sends the sensor data 107 as well.

Thus, in some embodiments, the one or more processors of the wearable electronic device 101 cause the wireless communication device of the wearable electronic device 101 to transmit at least some of the sensor data 107 to the companion electronic device 102. In one or more embodiments, the one or more electronic communications 136 comprise the sensor data 107 received by the one or more sensors 106 of the wearable electronic device 101 from the environment 104.

In one or more embodiments, the mode of operation selected for the wearable electronic device 101 and the companion electronic device 102 by the wearable electronic device 101 can be overridden by the authorized user 117 using a user interface of one or both of the wearable electronic device 101 and/or the companion electronic device 102. Illustrating by example, in one or more embodiments the authorized user 117 may deliver a voice command to override any normal mode of operation or privacy mode of operation that was established automatically. Thus voice command might be a special code word, such as "evening out," "sweet kimchi," or "tommy bahama" in one or more embodiments. Alternatively, the code word may be more direct, such as "privacy mode!" These code words can be assigned to various modes of operation. Thus, "evening out" may select a first privacy mode of operation, while "sweet kimchi" selects a second privacy mode of operation, and "tommy bahama" selects the normal mode of operation. It should be noted that these code words are examples only, as numerous others will be obvious to those of ordinary skill in the art having the benefit of this disclosure.

Illustrating by example, after the privacy mode of operation 137 is automatically set due to the fact that three persons 126,127,128 are present in the environment 104 with the authorized user 117, the authorized user 117 may cause one or both of the wearable electronic device 101 and/or the companion electronic device 102 to transition to the normal mode of operation 123 by delivering a voice command stating, "It's Okay! We're all friends!" Upon receiving this voice command, one or both of the wearable electronic device 101 and/or the companion electronic device 102 can adjust, with its one or more processors, the mode of operation from the privacy mode of operation 137 to the normal mode of operation 123.

Figure 2:
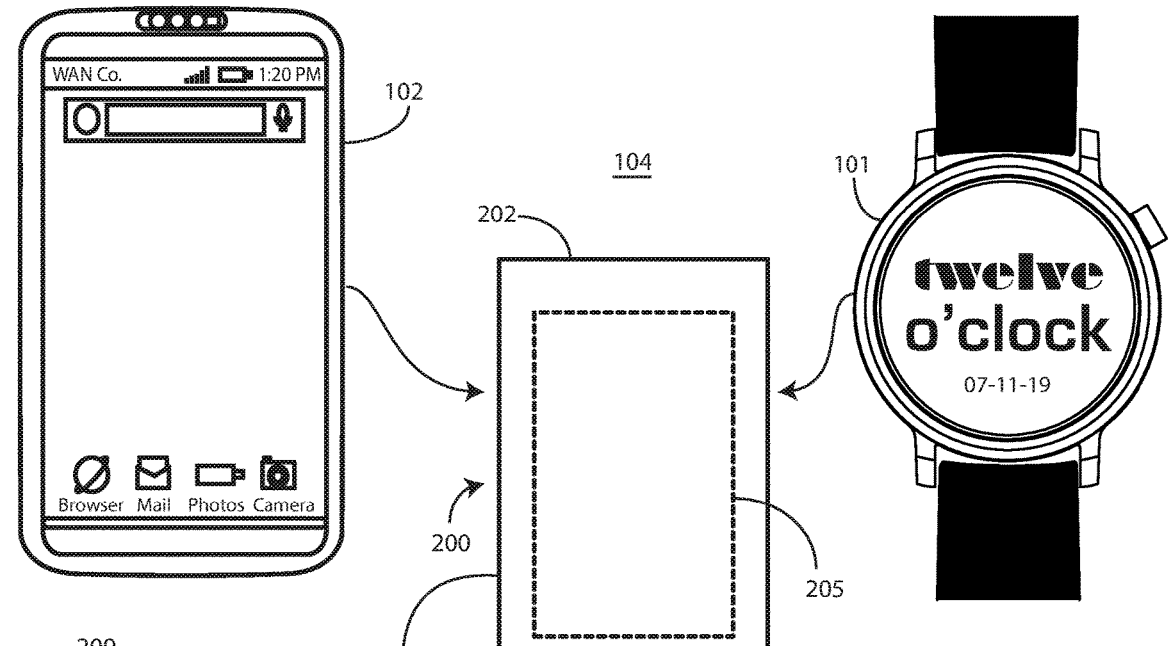
FIG. 2 illustrates one explanatory electronic device in accordance with one or more embodiments of the disclosure.
Figure 2:
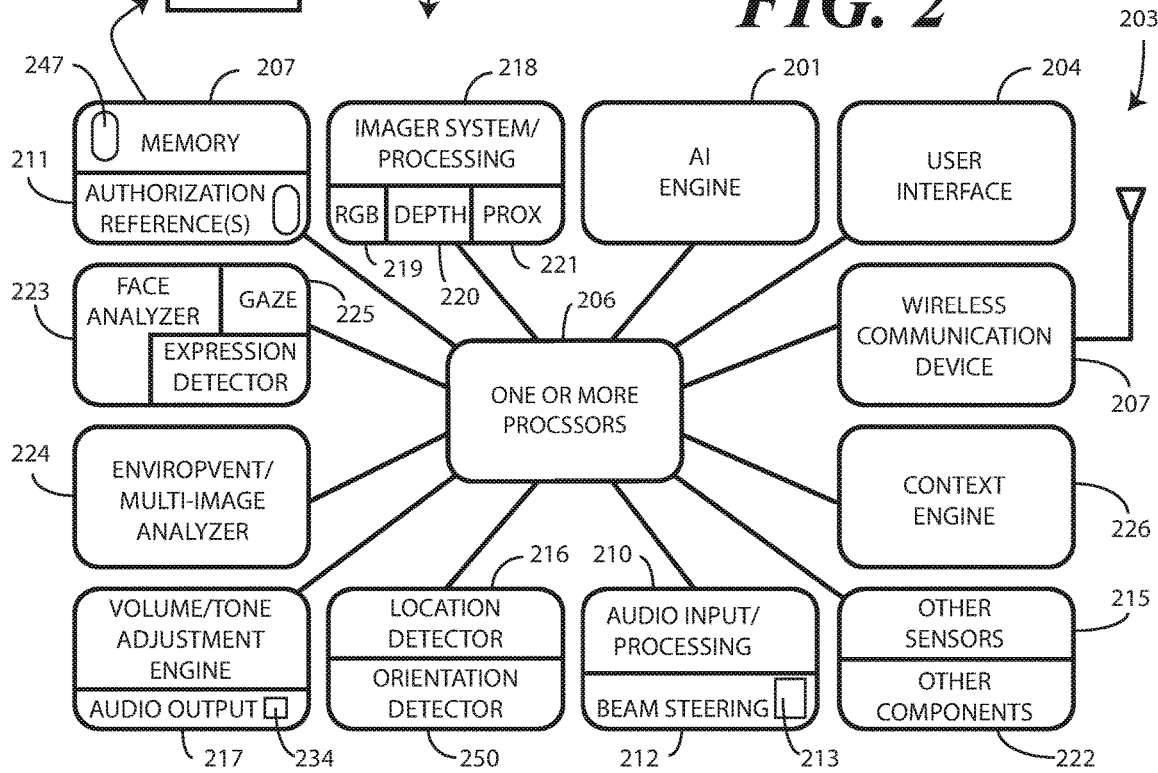

Turning now to FIG. 2, illustrated therein is one explanatory electronic device 200 configured in accordance with one or more embodiments of the disclosure. The electronic device 200 of FIG. 2 could be either the wearable electronic device 101 or the companion electronic device 102. Alternatively, the electronic device 200 could be another electronic device that is in communication with one or both of the companion electronic device 102 or the wearable electronic device 101. Thus, the generic description of the "electronic device 200" with reference to FIG. 2 could describe one or both of the wearable electronic device 101 or the companion electronic device 102.

In the illustrative system (100) of FIG. 1, the wearable electronic device 101 was the master, while the companion electronic device 102 was responsive to the master. Embodiments of the disclosure contemplate that the master device and the slave device can be configured differently in some embodiments. For example, the master device may have more sensors than the slave device in some instances. The master device may have an AI engine 201 configured to determine whether a setting or environment around the electronic device is public, partially public, or private, while the slave device may not be so equipped, and so forth. Alternatively, the slave device may have more components that the master device in other embodiments.

As shown in FIG. 2, in one or more embodiments the electronic device 200 includes a housing 202 and one or more straps that allow the electronic device 200 to be worn around a wrist as a watch or folded over and clipped to a garment. While a smart watch is one embodiment of a electronic device 200, other types of wearable electronic devices and/or other mechanical configurations of wearable electronic devices will be obvious to those of ordinary skill in the art having the benefit of this disclosure.

Also illustrated in FIG. 2 is one explanatory block diagram schematic 203 of the electronic device 200. In one or more embodiments, the block diagram schematic 203 is configured as a printed circuit board assembly disposed within the housing 202 or one or more straps of the electronic device 200. Various components can be electrically coupled together by conductors or a bus disposed along one or more printed circuit boards. It should be noted that the block diagram schematic 203 includes many components that are optional, but which are included in an effort to demonstrate how varied electronic devices configured in accordance with embodiments of the disclosure can be.

Illustrating by example, in one or more embodiments the electronic device 200 includes an audio input device 213 to receive audio input and an audio output device 217 to deliver audio output. Where the electronic device 200 is configured to be purely a voice assistant device, a display 205 would be optional, in that it is not required for this voice-based user interaction convention. As such, in one or more embodiments the electronic device 200 is devoid of a display 205, while in other embodiments the display 205 is included. The fact that the electronic device 200 can be devoid of the display 205 is illustrated in FIG. 2 by way of the display 205 being shown in dashed line.

Accordingly, it is to be understood that the block diagram schematic 203 of FIG. 2 is provided for illustrative purposes only and for illustrating components of one electronic device 200 in accordance with embodiments of the disclosure. The block diagram schematic 203 of FIG. 2 is not intended to be a complete schematic diagram of the various components required for an electronic device 200, be it the wearable electronic device 101, the companion electronic device 102, or another electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Embodiments of the disclosure contemplate that the number and arrangement of such components can change depending on the particular application. For example, an electronic device 200, be it the wearable electronic device 101 or the companion electronic device 102, may have fewer, or different, components from another electronic device configured in accordance with embodiments of the disclosure. An electronic device configured as a dedicated voice assistant may have fewer, or different, components from a smartphone, and so forth. Accordingly, electronic devices configured in accordance with embodiments of the disclosure can include some components that are not shown in FIG. 2, and other components that are shown may not be needed and can therefore be omitted.

The illustrative block diagram schematic 203 includes a user interface 204. In one or more embodiments, the user interface 204 includes a display 205, which may optionally be touch-sensitive. In one embodiment, users can deliver user input to the display 205 of such an embodiment by delivering touch input from a finger, stylus, or other objects disposed proximately with the display 205. In one embodiment, the display 205 is configured as an active matrix organic light emitting diode (AMOLED) display. However, it should be noted that other types of displays, including liquid crystal displays, suitable for use with the user interface 204 would be obvious to those of ordinary skill in the art having the benefit of this disclosure.

In one embodiment, the electronic device 200 includes one or more processors 206. In one embodiment, the one or more processors 206 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 203. Each of the application processor and the auxiliary processor(s) can be configured to process and execute executable software code to perform the various functions of the electronic device 200. A storage device, such as memory 207, can optionally store the executable software code used by the one or more processors 206 during operation.

The memory 207 can also store user data 247. Embodiments of the disclosure contemplate that the user data 247 can have varying levels of privacy preferences associated therewith. Health information and financial information, for example, may have a privacy preference where only the authorized user is able to access this information. Family pictures, calendar information, and contact lists may have another, less restrictive privacy preference associated therewith, which allows the authorized user and designated others, e.g., family members, to access this information. More generic information, such as the time of day, game scores, and social media profiles may be publicly available.

In this illustrative embodiment, the block diagram schematic 203 also includes a communication device 208 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication device 208 may also utilize wireless technology for communication, such as, but are not limited to, peer-to-peer or ad hoc communications such as HomeRF, Bluetooth.sup.™ and IEEE 802.11 (a, b, g or n); and other forms of wireless communication such as infrared technology. The communication device 208 can include wireless communication circuitry, one of a receiver, a transmitter, or transceiver, and one or more antennas.

In one embodiment, the one or more processors 206 can be responsible for performing the primary functions of the electronic device 200. For example, in one embodiment the one or more processors 206 comprise one or more circuits operable with the user interface 204 to present presentation information to a user. Additionally, the one or more processors 206 can be operable with an audio output device 217 to deliver audio output to a user. The executable software code used by the one or more processors 206 can be configured as one or more modules 209 that are operable with the one or more processors 206. Such modules 209 can store instructions, control algorithms, and so forth.

In one or more embodiments, the block diagram schematic 203 includes an audio input/processor 210. The audio input/processor 210 is operable to receive audio input from a source, such as a person, authorized user, plurality of persons within an environment 104 about the wearable electronic device 101, from the environment 104 about the wearable electronic device 101, or combinations thereof. The audio input/processor 210 can include hardware, executable code, and speech monitor executable code in one embodiment. The audio input/processor 210 can be operable with one or more predefined authentication references 211 stored in memory 207.

The predefined authentication references 211 can comprise representations of basic speech models, representations of trained speech models, or other representations of predefined audio sequences that are used by the audio input/processor 210 to receive and identify speech captured by an audio input device 213. In one embodiment, the audio input/processor 210 can include a voice recognition engine. Regardless of the specific implementation utilized in the various embodiments, the audio input/processor 210 can access various speech models stored with the predefined authentication references 211 to identify speech commands. As noted above, this speech can be captured in a passive listening mode to determine whether the electronic device 200 should enter a privacy mode of operation or a normal mode of operation.

The audio input/processor 210 can include a beam steering engine 212. The beam steering engine 212 can be operable with one or both of an audio input device 213, such as one or more microphones, and/or an audio output device 217, such as one or more loudspeakers. When functioning with the audio input device 213, the beam steering engine 212 can process audio input from, for example, one or more microphones defining a virtual microphone. This virtual microphone can define an acoustic reception cone that can be virtually "steered" around the wearable electronic device 101. Alternatively, actual steering can occur as well, such as switching between a left microphone and right microphone or a front and back microphone, or switching various microphones ON and OFF individually. In one or more embodiments, two or more microphones can be included for selective beam steering by the beam steering engine 212.

Illustrating by example, a first microphone can be located on a first side of the wearable electronic device 101 for receiving audio input from a first direction, while a second microphone can be placed on a second side of the wearable electronic device 101 for receiving audio input from a second direction. These microphones can be "steered" by selectively turning them ON and OFF.

The beam steering engine 212 can then select between the first microphone and the second microphone to beam steer audio reception toward an object, such as a user delivering audio input. This beam steering can be responsive to input from other sensors 215, such as imagers, facial depth scanners, thermal sensors, or other sensors. For example, an imager can estimate a location of a person's face and deliver signals to the beam steering engine 212 alerting it in which direction to focus the acoustic reception cone and/or steer the first microphone and the second microphone, thereby adding confirmation to audio steering and saving time.

Where multiple people are around the wearable electronic device 101, this steering advantageously directs a beam reception cone to the authorized user.

Alternatively, the beam steering engine 212 can process and combine the signals from two or more microphones to perform beam steering. The one or more microphones can be used for capturing speech. In response to control of the one or more microphones by the beam steering engine 212, the locations of various persons in the environment 104 can be determined. The beam steering engine 212 can then select between the first microphone and the second microphone to capture speech from specific persons in the environment 104. Alternatively, the audio input/processor 210 can employ a weighted combination of the microphones to capture speech from specific persons in the environment 104. Alternatively, an imager 219 can analyze lip movement from captured images to identify the speech.

When functioning with the audio output device 217, the beam steering engine 212 can deliver audio output to, for example, one or more loudspeakers such that the one or more loudspeakers define a directional loudspeaker. In one or more embodiments, the one or more loudspeakers include at least two ultrasound transducers that allow audio output to be delivered to specific locations where outputs from the ultrasound transducers intersect and generate an audible beat. In one or more embodiments, this allows the beam steering engine 212 to steer audio output in situations where not everyone within the environment of the wearable electronic device 101 needs to hear the audio output.

Various sensors 215 can be operable with the one or more processors 206. A first example of a sensor that can be included with the various sensors 215 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 206, to detect an object in close proximity with—or touching—the surface of the display 205 or the housing 202 of the electronic device 200 by establishing electric field lines between pairs of capacitive sensors and then detecting perturbations of those field lines.

Another example of a sensor 215 is a geo-locator that serves as a location detector 216. In one embodiment, location detector 216 is able to determine location data. Location can be determined by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the location detector 216 autonomously or with assistance from terrestrial base stations, for example those associated with a cellular communication network or other ground based network, or as part of a Differential Global Positioning System (DGPS), as is well known by those having ordinary skill in the art. The location detector 216 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 250 that determines an orientation and/or movement of the wearable electronic device 101 in three-dimensional space. Illustrating by example, the orientation detector 250 can include an accelerometer, gyroscopes, or other device to detect device orientation and/or motion of the wearable electronic device 101. Using an accelerometer as an example, an accelerometer can be included to detect motion of the electronic device. Additionally, the accelerometer can be used to sense some of the gestures of the user, such as one talking with their hands, running, or walking.

The orientation detector 250 can determine the spatial orientation of the electronic device 200 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 200.

An imager processor system 218 can be included in the electronic device 200 and can be operable with the one or more processors 206. The imager processor system can include one or more sensors 215. For example, in one or more embodiments the one or more sensors 215 included with the imager processor system 218 comprise one or more of an imager 219, a depth imager 220, and, optionally, one or more proximity sensors 221.

In one embodiment, the imager 219 comprises a two-dimensional imager configured to receive at least one image of an environment 104 about the electronic device 200. In one embodiment, the imager 219 comprises a two-dimensional Red-Green-Blue (RGB) imager. In another embodiment, the imager 219 comprises an infrared imager. Other types of imagers suitable for use as the imager 219 of electronic device 200 will be obvious to those of ordinary skill in the art having the benefit of this disclosure.

The one or more proximity sensors 221, where included, can take various forms. In one or more embodiments, the one or more proximity sensors 221 fall in to one of two camps: active proximity sensors and "passive" proximity sensors. Either the proximity detector components or the proximity sensor components can be generally used for detecting persons being present within the environment 104, distances between warm objects and the electronic device 200, changes in distance between warm objects and the wearable electronic device, and other information.

As used herein, a "proximity sensor component" comprises a signal receiver only that does not include a corresponding transmitter to emit signals for reflection off an object to the signal receiver. A signal receiver only can be used due to the fact that a user's body or other heat generating object external to the electronic device 200 serves as the transmitter. Illustrating by example, in one embodiment the proximity sensor components comprise a signal receiver to receive signals from objects external to the housing 202 of the electronic device 200.

In one embodiment, the signal receiver is an infrared signal receiver to receive an infrared emission from a source, such as a human being, when the human being is approaching the electronic device 200. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about fifteen feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors 206 can cause each proximity sensor component to operate at a first "effective" sensitivity so as to receive infrared emissions from a first distance. Similarly, the one or more processors 206 can cause each proximity sensor component to operate at a second sensitivity, which is less than the first sensitivity, so as to receive infrared emissions from a second distance, which is less than the first distance. The sensitivity change can be effected by causing the one or more processors 206 to interpret readings from the proximity sensor component differently.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

In one embodiment, the one or more proximity sensors 221 simply comprise a proximity sensor component. In another embodiment, the one or more proximity sensors 221 comprise a simple thermopile. In another embodiment, the one or more proximity sensors 221 comprise an infrared imager that captures the amount of thermal energy emitted by an object. In still other embodiments, the one or more proximity sensors 221 comprise a proximity detector component. Of course, combinations of these components can be used as the one or more proximity sensors 221. Moreover, other types of proximity sensors suitable for use with the electronic device 200 will be obvious to those of ordinary skill in the art having the benefit of this disclosure.

As with the one or more proximity sensors 221, the depth imager 220, where included, can take a variety of forms. In a first embodiment, the depth imager 220 comprises a pair of imagers separated by a predetermined distance, such as three to four images. This "stereo" imager works in the same way the human eyes do in that it captures images from two different angles and reconciles the two to determine distance.

In another embodiment, the depth imager 220 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 220 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 220 adds a third "z-dimension" to the x-dimension and y-dimension defining the two-dimensional image captured by the imager 219, thereby enhancing the accuracy of detecting persons being present within the environment 104.

In one or more embodiments, the imager processor system 218 can be operable with a face analyzer 223 and an environmental analyzer 224. The face analyzer 223 and/or environmental analyzer 224 can be configured to process an image or depth scan of an object and determine whether the object matches predetermined criteria by comparing the image or depth scan to one or more predefined authentication references 211 stored in memory 207.

For example, the face analyzer 223 and/or environmental analyzer 224 can operate as public/private environment detector configured with optical and/or spatial recognition to identify objects using image recognition, character recognition, visible recognition, facial recognition, color recognition, shape recognition, and the like. Advantageously, the face analyzer 223 and/or environmental analyzer 224, operating in tandem with the imager processor system 218, can be used as a facial recognition device to not only identify when multiple persons are present within the environment 104, but also attempt to determine the identity of one or more persons detected within an environment 104.

In one embodiment when the imager processor system 218 detects a person, one or both of the imager 219 and/or the depth imager 220 can capture a photograph and/or depth scan of that person. The imager processor system 218 can then compare the image and/or depth scan to one or more predefined authentication references 211 stored in the memory 207. This comparison, in one or more embodiments, is used to confirm beyond a threshold authenticity probability that the person's face—both in the image and the depth scan—sufficiently matches one or more of the predefined authentication references 211 stored in the memory 207 to identify the person.

Beneficially, this optical recognition performed by the imager processor system 218 operating in conjunction with the face analyzer 223 and/or environmental analyzer 224 can be used to determine whether the environment 104 includes a public setting, a partially public setting, or a private setting. Illustrating by example, when more persons than the authorized user are detected in the environment 104, the one or more processors 206 may conclude that the environment 104 is that of a public setting. However, when more persons than the authorized user are detected in the environment 104, and when each of the persons detected about the wearable electronic device 101 are sufficiently identified by the face analyzer 223 and/or environmental analyzer 224, the one or more processors 206 may determine that the environment 104 is that of a semi-public setting. When only the authorized user is present, the one or more processors 206 may determine that the environment 104 is private.

A gaze detector 225 can be operable with the imager processor system 218 operating in conjunction with the face analyzer 223. The gaze detector 225 can comprise sensors for detecting the user's gaze point. The gaze detector 225 can optionally include sensors for detecting the alignment of a user's head in three-dimensional space. Electronic signals can then be processed for computing the direction of user's gaze in three-dimensional space.

The face analyzer 223 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 219 or the depth imager 220 for computing the direction of user's gaze in three-dimensional space.

Other components 222 operable with the one or more processors 206 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers 234, the ultrasound transducers (where included), or other alarms and/or buzzers. The other components 222 can also include a mechanical output component such as vibrating or motion-based mechanisms.

The other components 222 can optionally include a barometer operable to sense changes in air pressure due to elevation changes or differing pressures of the electronic device 200. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 222 can also optionally include a light sensor that detects changes in optical intensity, color, light, or shadow in the environment of the electronic device 200. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 200. Similarly, a temperature sensor can be configured to monitor temperature about an electronic device.

In one or more embodiments, the one or more processors 206 can define one or more process engines. One example of such a process engine is a context engine 226. The process engines can be a component of the one or more processors 206, operable with the one or more processors 206, defined by the one or more processors 206, and/or integrated into the one or more processors 206. Other configurations for the process engines, including as software or firmware modules operable on the one or more processors 206, will be obvious to those of ordinary skill in the art having the benefit of this disclosure.

The context engine 226 can be operable with the various sensors to detect, infer, capture, and otherwise determine persons and actions that are occurring in the environment 104 about the electronic device 200. For example, where included one embodiment of the context engine 226 determines assessed contexts and frameworks using adjustable algorithms of context assessment employing information, data, and events. These assessments may be learned through repetitive data analysis, and may be assisted by the AI engine 201. Alternatively, a user may employ the user interface 204 to enter various parameters, constructs, rules, and/or paradigms that instruct or otherwise guide the context engine 226 in detecting multi-modal social cues, emotional states, moods, and other contextual information. The context engine 226 can comprise an artificial neural network, an AI engine 201, or other similar technology in one or more embodiments.

In one or more embodiments, the context engine 226 is operable with the one or more processors 206. In some embodiments, the one or more processors 206 can control the context engine 226. In other embodiments, the context engine 226 can operate independently, delivering information gleaned from detecting multi-modal social cues, emotional states, moods, and other contextual information to the one or more processors 206. The context engine 226 can receive data from the various sensors. In one or more embodiments, the one or more processors 206 are configured to perform the operations of the context engine 226.

In one or more embodiments, the various sensors 215 of FIG. 2 are able to capture sensor data from the environment 104. In one or more embodiments, the one or more processors 206 are determine a conclusion identifying whether the electronic device 200 is in a public setting or a private setting. Where the electronic device 200 is in a public setting, in one or more embodiments the one or more processors 206 can use the various components of the electronic device 200 to attempt to identify each person in the environment 104. In this manner, the one or more processors 206 can determine whether the persons in the environment 104 are known, e.g., an authorized user of the electronic device 200 and one or more known acquaintances, or whether some of the persons are unknown individuals.

Whether the persons are known or unknown can serve as an input to the one or more processors 206 in determining which privacy mode of operation the electronic device 200 should enter. For example, if the one or more processors 206 determine that the persons of the environment 104 are all identifiable, the one or more processors 206 may conclude that the electronic device 200 is in a semi-private environment. By contrast, if no person other than the authorized user is identified, the one or more processors 206 may conclude that the electronic device 200 is in a fully public environment. This identification function can further be used to initialize the operating mode as well.

Figure 3:
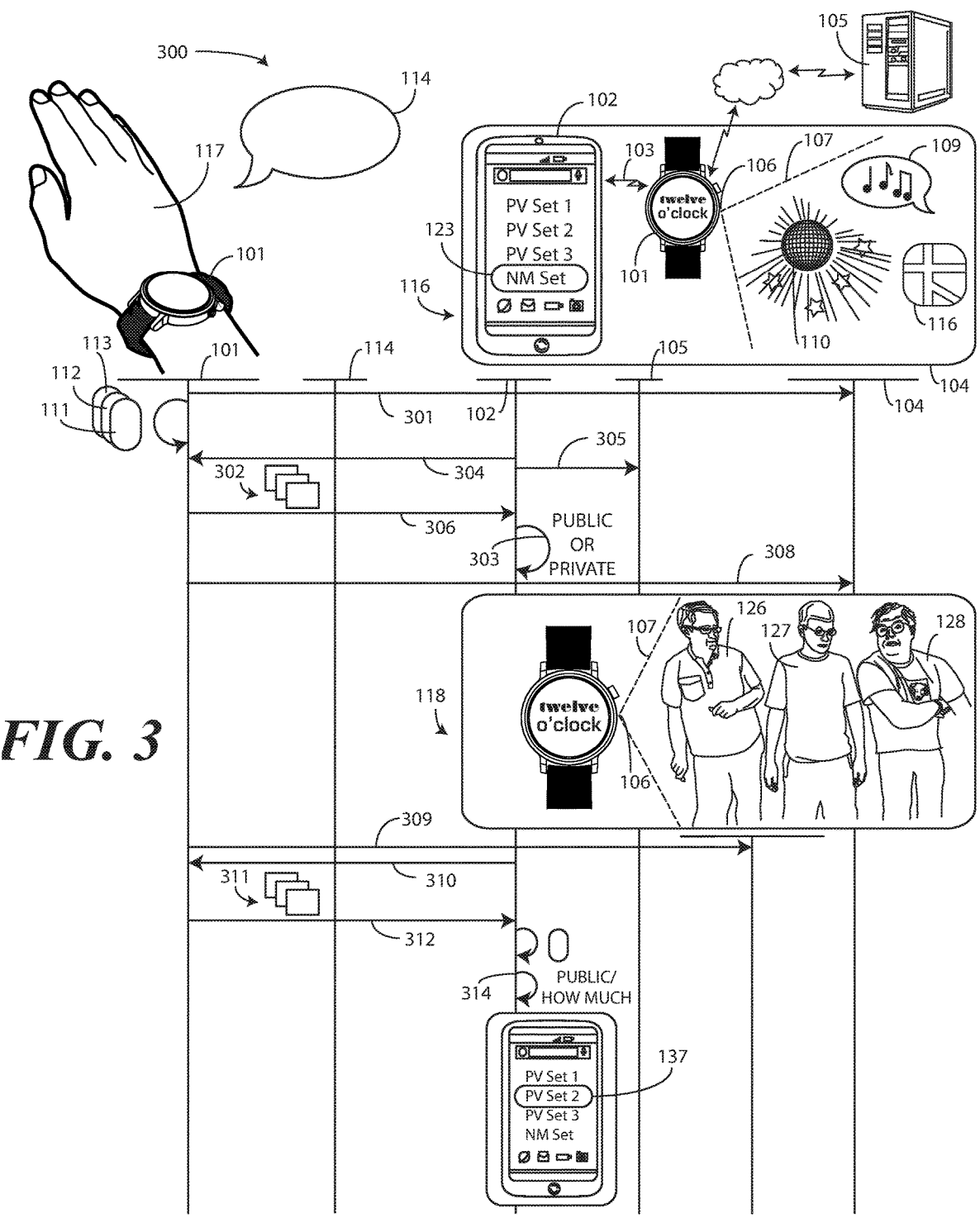
FIG. 3 illustrates another explanatory system and method in accordance with one or more embodiments of the disclosure.

Now that various hardware components have been described for an explanatory electronic device 200 suitable for use with the system (100) of FIG. 1, attention will be turned to alternate systems configured in accordance with one or more embodiments of the disclosure. Turning now to FIG. 3, illustrated therein is another explanatory system 300 in accordance with one or more embodiments of the disclosure.

As before, one or more sensors 106 of a wearable electronic device 101 are used to monitor 301 the environment 104. The one or more sensors 106 of the wearable electronic device 101 can periodically sample environmental conditions, including sounds, lighting conditions, temperatures, captured images, noise levels, locations, and so forth.

Rather than the wearable electronic device 101 being the master, as was the case in the system (100) of FIG. 1, in the system 300 of FIG. 3, the companion electronic device 102 is the master. In this embodiment, the one or more processors of the companion electronic device 102 make their own conclusion regarding whether the companion electronic device 102 is in a public setting or private setting. However, since the wearable electronic device 101 is generally in a better position to have its one or more sensors 106 monitor the environment 104, in this system 300 the one or more processors of the companion electronic device 102 do this by accessing the one or more sensors 106 of the wearable electronic device 101 and by receiving sensor data 107 from the sensors of the wearable electronic device.

In the system 300 of FIG. 3, the wearable electronic device 101 becomes a contextual beacon in that it sends sensor data 107 to the companion electronic device 102. The companion electronic device 102 then makes decisions regarding whether the environment 104 is public or private as a function of this received sensor data 107. It should be noted that while a single wearable electronic device 101 is shown as sending the sensor data 107 in FIG. 3, the companion electronic device 102 can receive sensor data from one or a plurality of paired wearable electronic devices.

In this embodiment, a communication device of the companion electronic device 102 receives one or more electronic communications 302 comprising the sensor data 107 from one or more paired electronic devices, which in this example includes the wearable electronic device 101. The one or more processors of the companion electronic device 102 then execute a decision operation 303 using the sensor data 107 from the electronic communications 302 as inputs.

If the wearable electronic device 101 were the master, as was the case in the system (100) of FIG. 1, this decision operation 303 might comprise obtaining an instruction from the one or more electronic communications 302 requiring the one or more processors of the companion electronic device 102 to enter a privacy mode of operation 137 or a normal mode of operation 123. However, in the system 300 of FIG. 3, the companion electronic device 102 is the master. Accordingly, in one or more embodiments the decision operation 303 determines whether the companion electronic device 102 is in the public setting or the private setting.

Where or when the decision operation 303 determines that the companion electronic device 102 is in the private setting, the one or more processors of the companion electronic device 102 cause the companion electronic device 102 to enter a normal mode of operation 123. Where or when the decision operation 303 determines that the companion electronic device 102 is in the public setting, the one or more processors of the companion electronic device 102 cause the companion electronic device 102 to enter a privacy mode of operation 137.

In one or more embodiments, the companion electronic device 102 comprises a wireless communication device that establishes the paired communication connection 103 with the wearable electronic device 101. As illustrated in FIG. 3, the wearable electronic device 101 is paired via a paired communication connection 103 with a companion electronic device 102. The wearable electronic device 101 and the companion electronic device 102 are each operating within the environment 104.

In one or more embodiments, one or more sensors 106 of the wearable electronic device 101 monitor 301 the environment 104. In the illustrative embodiment of FIG. 3, the one or more sensors 106 of the wearable electronic device receive sensor data 107 from the environment 104. As previously described, examples of the sensor data 107 include sounds 109, ambient lighting conditions 110, temperature 111, captured images 112, noise levels 113, detected speech 114, location 115, and so forth. The sensor data 107 can also include the detection of other electronic devices operating within the environment 104 as well.

In one or more embodiments, the companion electronic device 102 is able to communicate 304 with the wearable electronic device 101 to request sensor data 107 be transmitted in the form of one or more electronic communications 302. In one or more embodiments, the companion electronic device 102 is also optionally able to communicate 305 with one or more cloud electronic devices 105. While tapping into the one or more sensors 106 of the wearable electronic device 101 to monitor 301 the environment 104 is one way for the companion electronic device 102 to determine whether the environment 104 is public or private, the companion electronic device 102 can use the cloud electronic devices 105 to assist in making the determination as well. For example, the companion electronic device 102 can also communicate 305 with one or more cloud electronic devices 105 to obtain information such as what type of business is located at a particular location, what type of devices make certain types of sounds 109 detected within the environment 104, what types of situations use the ambient lighting conditions 110 detected in the environment 104, and so forth.

In one or more embodiments, the companion electronic device 102 communicates 304 with the wearable electronic device 101 to request the wearable electronic device 101 transmit one or more electronic communications 302 to the companion electronic device 102. One or more processors operating within the companion electronic device 102 determine, from the one or more electronic communications 302, whether the environment 104 is a public environment or a private environment.

Where the electronic communications 302 comprise sensor data 107 received by the one or more sensors 106 of the wearable electronic device 101, in one embodiment the one or more processors determine whether the environment 104 is a public environment or a private environment only from this sensor data 107. In other embodiments, however, the companion electronic device 102 can have its own sensors. Accordingly, it can capture other sensor data 307 from the environment 104 in one or more embodiments.

Where the companion electronic device 102 includes its own sensors, such as one or more of the sensors (215) described above with reference to FIG. 2, the one or more processors determine whether the environment 104 is the public environment or the private environment from a combination of the sensor data 107 and other sensor data 307 received by the one or more sensors situated in the companion electronic device 102. Similarly, if the companion electronic device 102 is in communication 305 with cloud electronic devices 105, data from the cloud electronic devices 105 can be used to determine whether the environment 104 is the public environment or the private environment, in combination with one or both of the sensor data 107 or the other sensor data 307. These decisions allow the companion electronic device 102 to determine whether the wearable electronic device 101 should enter a privacy mode of operation or a public mode of operation.

If the environment 104 is a public environment, or a quasi-public environment, or a semi-public environment, the one or more processors would determine that the companion electronic device 102 should enter a privacy mode of operation 137 to protect sensitive data that may be stored within the companion electronic device 102. By contrast, if the environment 104 is a private environment, the one or more processors would determine that the companion electronic device 102 should enter a normal mode of operation 123 in which access to stored data is unrestricted due to environmental condition.

Since the environment 104 can also be semi-private or quasi-private, in one or more embodiments the privacy mode of operation 137 can be selected from a plurality of privacy modes of operation, three examples of which are shown on the display of the companion electronic device 102 in FIG. 3. Specifically, where the privacy mode of operation 137 comprises one privacy mode of operation selected from a plurality of privacy modes of operation, with each privacy mode of operation of the plurality of privacy modes of operation allowing access to different amounts of the user data, the one or more processors of the companion electronic device 102 can execute a selection operation 314 to select the privacy mode of operation 137 from the plurality of privacy modes of operation. In one or more embodiments, the sensor data 107 received in the one or more electronic communications 311 can be used as inputs for the selection operation 314.

In one or more embodiments, each privacy mode of operation of the plurality of privacy modes of operation allows access to different amounts of the user data. Thus, when in a first privacy mode of operation selected for a public environment, all personal data may be precluded from announcement from audible outputs or visibility on displays. By contrast, in a semi-private environment some information may be revealed while other information is restricted.

In one or more embodiments, when the companion electronic device 102 is the master, it can communicate its decision as to whether the environment 104 includes a public setting or a private setting to the wearable electronic device 101, as described above with reference to FIG. 1, but in the opposite direction. However, in another embodiment, since the wearable electronic device 101 is a contextual beacon, it can still make its own decision regarding whether the environment 104 includes a public setting or a private setting.

Where the companion electronic device 102 is receiving sensor data 107 from multiple wearable electronic devices operating within the environment 104, the companion electronic device 102 can aggregate this various contextual data to determine whether the environment 104 includes a public setting or a private setting. An authorized user 117 may have multiple wearable electronic devices belonging to the same group like a family operating within the environment 104 and delivering sensor data to the companion electronic device 102. The companion electronic device 102 can then aggregate these multiple beacons to make a decision regarding whether the environment 104 includes a public setting or a private setting.

In one or more embodiments, the one or more processors of the companion electronic device 102 execute a decision operation 303 using data, here sensor data 107, from the one or more electronic communications 302 received from the wearable electronic device 101 as inputs. In one or more embodiments, the decision operation 303 determines whether the companion electronic device 102 is in a public setting or a private setting. Where or when the companion electronic device 102 is in the private setting, the one or more processors can cause the companion electronic device 102 to enter the normal mode of operation 123. When or where the companion electronic device 102 is in the public setting, the one or more processors can cause by the companion electronic device 102 to enter a privacy mode of operation 137.

As shown in FIG. 3, at time 116 the environment 104 is a private environment, as only the authorized user 117 is present. Accordingly, decision operation 303 determines that the companion electronic device 102 is in the private setting, and the one or more processors of the companion electronic device 102 enter the normal mode of operation 123.

Thereafter, the wearable electronic device 101 continues to monitor 308 the environment 104. At time 118, one or more persons 126,127,128 have entered the environment 104. In one or more embodiments, the sensor data 107 received by the one or more sensors 106 detect 309 the one or more persons 126,127,128. The companion electronic device 102 can request 310 continued or periodic electronic communications 311 comprising this sensor data, which can be transmitted 312 from the wearable electronic device 101 to the companion electronic device 102. The companion electronic device can then execute another decision operation 313 to determine that the environment 104 has shifted from a private setting to a public setting from the sensor data 107 received in the one or more electronic communications 122. Since the companion electronic device 102 is now in a public setting, the one or more processors can cause by the companion electronic device 102 to enter a privacy mode of operation 137.

As shown in FIG. 3, the privacy mode of operation 137 is one privacy mode of operation selected from a plurality of privacy modes of operation. Each privacy mode of operation allows access to different amounts of user data stored in the memory of the companion electronic device 102. Accordingly, the one or more processors of the companion electronic device 102 must select which privacy mode of operation to enter.

Where the electronic communications 302 comprise sensor data 107 received by the one or more sensors 106 of the wearable electronic device 101, in one embodiment the selection of which privacy mode of operation to enter occurs only from this sensor data 107. In other embodiments, where the companion electronic device 102 includes its own sensors, such as one or more of the sensors (215) described above with reference to FIG. 2, the one or more processors determine which privacy mode of operation to enter from a combination of the sensor data 107 and other sensor data 307 received by the one or more sensors situated in the companion electronic device 102. Illustrating by example, if the one or more processors can identify each of the persons 126,127,128 within the environment 104, a less restrictive privacy mode of operation might be selected than when none of the persons 126,127,128 can be identified, and so forth.

Similarly, if the companion electronic device 102 is in communication 305 with cloud electronic devices 105, data from the cloud electronic devices 105 can be used to determine which privacy mode of operation to enter. This data from the cloud electronic devices 105 can be used to select which privacy mode of operation to enter in combination with one or both of the sensor data 107 or the other sensor data 307. Other techniques for selecting which privacy mode of operation to enter will be obvious to those of ordinary skill in the art having the benefit of this disclosure.

Figure 4:
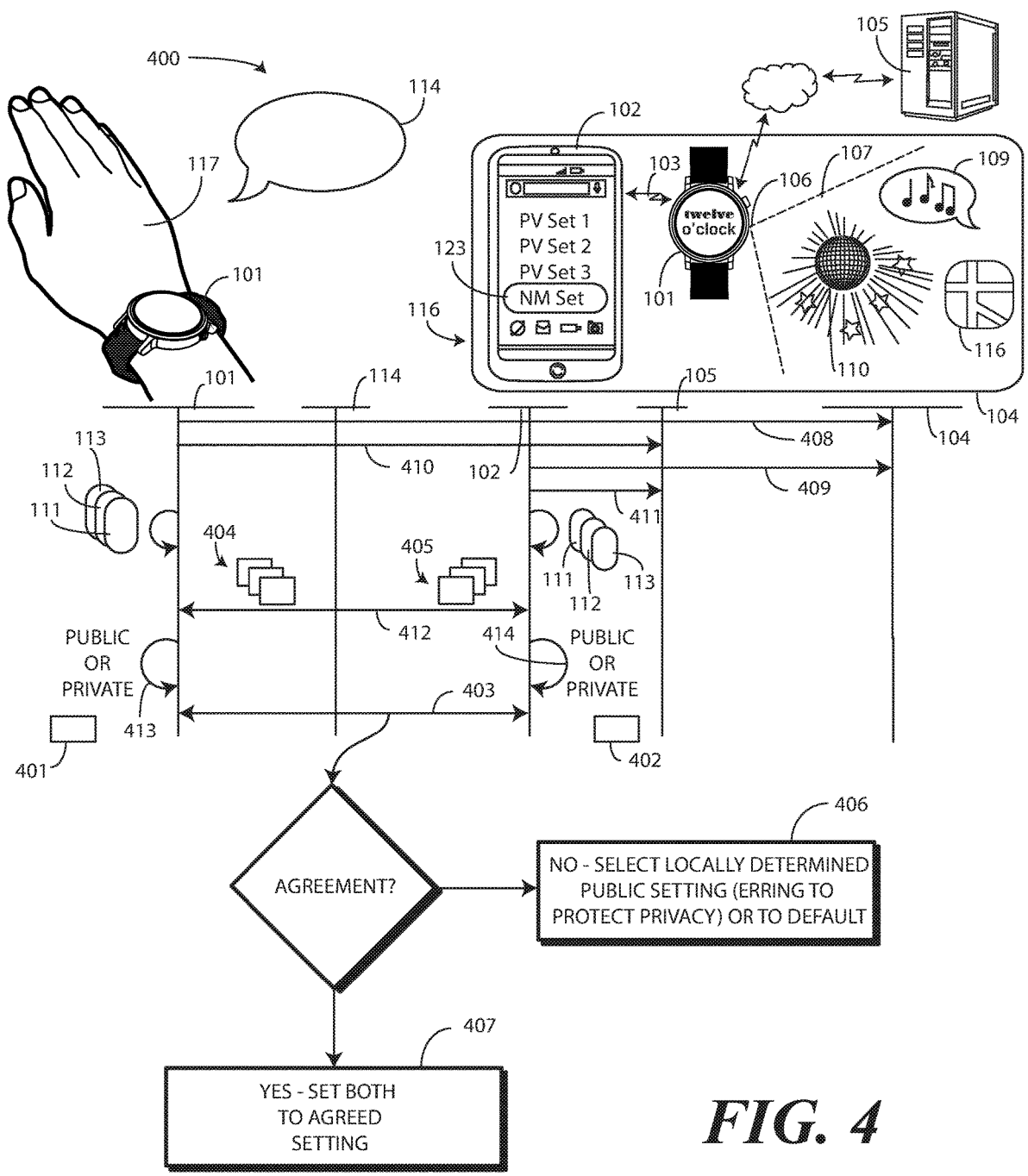
FIG. 4 illustrates still another explanatory system and method in accordance with one or more embodiments of the disclosure.

In the system (100) of FIG. 1, the wearable electronic device 101 was the master. In the system 300 of FIG. 3, the companion electronic device 102 was the master. Turning now to FIG. 4, illustrated therein is yet another system 400 configured in accordance with one or more embodiments of the disclosure. In the system 400 of FIG. 4, neither the wearable electronic device 101 nor the companion electronic device 102 is a master.

In this embodiment, both the wearable electronic device 101 and the companion electronic device 102 form their own conclusions 401,402 regarding whether the environment 104 is public or private. In one or more embodiments, the wearable electronic device 101 and the companion electronic device 102 use their own sensor data 107,307 to determine whether the environment 104 is public or private. In another embodiment, they use their own sensor data 107,307 in combination with the sensor data 307,107 from the other device to determine whether the environment 104 is public or private. For example, the wearable electronic device 101 can use the sensor data 107 its sensors receive in combination with sensor data 307 received from the companion electronic device 102. The companion electronic device 102 can do the same in one or more embodiments.

In one or more embodiments, the wearable electronic device 101 and the companion electronic device 102 then transmit 403 their conclusions 401,402 to the other device. Each device then compares the conclusion 401,402 it reached to the conclusion 402,401 received from the other electronic device. Where there is a match, the wearable electronic device 101 and the companion electronic device 102 enter the selected mode of operation.

In one or more embodiments, where there is not a match, each device presumes the public setting is occurring. In one or more embodiments, this occurs in an effort to err on the side of protecting personal information that may be stored in each electronic device. Thus, a privacy mode of operation is selected until overridden by the authorized user 117 or until there is a match between each conclusion 401,402 that the environment is private.

The system 400 of FIG. 4 can be advantageous in that the sensors of each device have a different perspective of the environment 104, different exposures to the environment 104, and different sensor coverages within the environment. By comparing the two conclusions 401,402, a more comprehensive assessment can result from the simultaneous comparison. Where there is agreement, e.g., both conclusions 401,402 indicate the environment 104 is private or the environment 104 is public, there is a higher confidence that the conclusion is correct since it came from multiple devices. If there is a disagreement, a private mode of operation is selected biasing operation of each electronic device toward extra caution.

In one or more embodiments, each of the wearable electronic device 101 and the companion electronic device 102 becomes a contextual beacon for the other in that it sends sensor data 107,307 to the other device. Each of the wearable electronic device 101 and the companion electronic device 102 then makes decisions regarding whether the environment 104 is public or private as a function of this received sensor data 307,107 in combination with its own sensor data 107,307. It should be noted that while a single wearable electronic device 101 and companion electronic device 102 are shown as sending the sensor data 107,307 in FIG. 4, in other embodiments a plurality of wearable electronic devices and/or a plurality of companion electronic devices are all broadcasting sensor data within the environment 104, with each device receiving and aggregating the received sensor data with its own to assess whether the environment 104 is public or private.

In one or more embodiments, each of the wearable electronic device 101 and the companion electronic device 102 receives one or more electronic communications 404, 405 from the other electronic device, which functions as a companion electronic device to each of the wearable electronic device 101 and the companion electronic device 102. In one or more embodiments, the one or more electronic communications 404,405 each comprise a conclusion 401, 402 identifying whether the environment 104 is a public environment or a private environment. As noted above, the one or more processors of each of the wearable electronic device 101 and the companion electronic device 102 also determine their own conclusion 401,402 identifying whether the environment 104 is a public environment or a private environment.

In one or more embodiments, the one or more processors of each of the wearable electronic device 101 and the companion electronic device 102 enter 407 the normal mode of operation 123 only where the conclusions 401,402 substantially match. In one or more embodiments, the one or more processors of each of the wearable electronic device 101 and the companion electronic device 102 execute a selection operation 406 to select a privacy mode of operation from a plurality of privacy modes of operation when the conclusions 401,402 fail to substantially match. In one or more embodiments, the selection operation 406 uses sensor data 107,307 captured by each device from its one or more sensors, and optionally in combination with the sensor data 307,107 received from the other electronic device in one or more electronic communications 404,405.

As with previous embodiments, the wearable electronic device 101 is paired via a paired communication connection 103 with a companion electronic device 102. The wearable electronic device 101 and the companion electronic device 102 are each operating within the environment 104.

In one or more embodiments, one or more sensors 106 of the wearable electronic device 101 monitor 408 the environment 104. In the illustrative embodiment of FIG. 4, the one or more sensors 106 of the wearable electronic device receive sensor data 107 from the environment 104. Where the companion electronic device 102 includes its own sensors, such as one or more of the sensors (215) described above with reference to FIG. 2, the one or more sensor of the companion electronic device 102 also monitor 409 the environment. The one or more sensors of the companion electronic device 102 receive sensor data 307 from the environment 104. As previously described, examples of the sensor data 107,307 include sounds 109, ambient lighting conditions 110, temperature 111, captured images 112, noise levels 113, detected speech 114, location 115, and so forth. The sensor data 107,307 can also include the detection of other electronic devices operating within the environment 104 as well.

In one or more embodiments, each of the wearable electronic device 101 and the companion electronic device 102 is also optionally able to communicate 410,411 with one or more cloud electronic devices 105. While using their own sensors and/or tapping into the sensors of the other device provide one way for each of the wearable electronic device 101 and the companion electronic device 102 to determine whether the environment 104 is public or private, each of the wearable electronic device 101 and the companion electronic device 102 can also use the cloud electronic devices 105 to assist in making the determination as well, as previously described.

In one or more embodiments, each of the wearable electronic device 101 and the companion electronic device 102 communicates 412 with the other by transmitting one or more electronic communications 404,405. One or more processors operating within each of the wearable electronic device 101 and the companion electronic device 102 determine, at least partially from the one or more electronic communications 404,405, whether the environment 104 is a public environment or a private environment. Where the electronic communications 404,405 comprise sensor data 107,307, in one embodiment the one or more processors of each of the wearable electronic device 101 and the companion electronic device 102 determine whether the environment 104 is a public environment or a private environment from this sensor data 107,307.

If one or both of each of the wearable electronic device 101 and the companion electronic device 102 is in communication 410,411 with cloud electronic devices 105, data from the cloud electronic devices 105 can be used to determine whether the environment 104 is the public environment or the private environment, in combination the sensor data 107,307. These decisions allow each of the wearable electronic device 101 and the companion electronic device 102 to determine whether to enter a privacy mode of operation or a public mode of operation.

In one or more embodiments, each of the wearable electronic device 101 and the companion electronic device 102 executing, with its one or more processors, a decision operation 413,414 determining whether each of the wearable electronic device 101 and the companion electronic device 102 is in a public setting or a private setting. In one or more embodiments, the output of the decision operation 413,414 is a conclusion 401,402.

In one or more embodiments, each of the wearable electronic device 101 and the companion electronic device 102 communicates 403 its conclusion 401,402 identifying whether the environment 104 is a public environment or a private environment to the other electronic device. In one or more embodiments, the one or more processors of each of the wearable electronic device 101 and the companion electronic device 102 enter 407 the normal mode of operation 123 only where the conclusions 401,402 substantially match. In one or more embodiments, the one or more processors of each of the wearable electronic device 101 and the companion electronic device 102 execute a selection operation 406 to select a privacy mode of operation from a plurality of privacy modes of operation when the conclusions 401,402 fail to substantially match. In one or more embodiments, the selection operation 406 uses sensor data 107,307 captured by each device from its one or more sensors, and optionally in combination with the sensor data 307,107 received from the other electronic device in one or more electronic communications 404,405.

Figure 5:
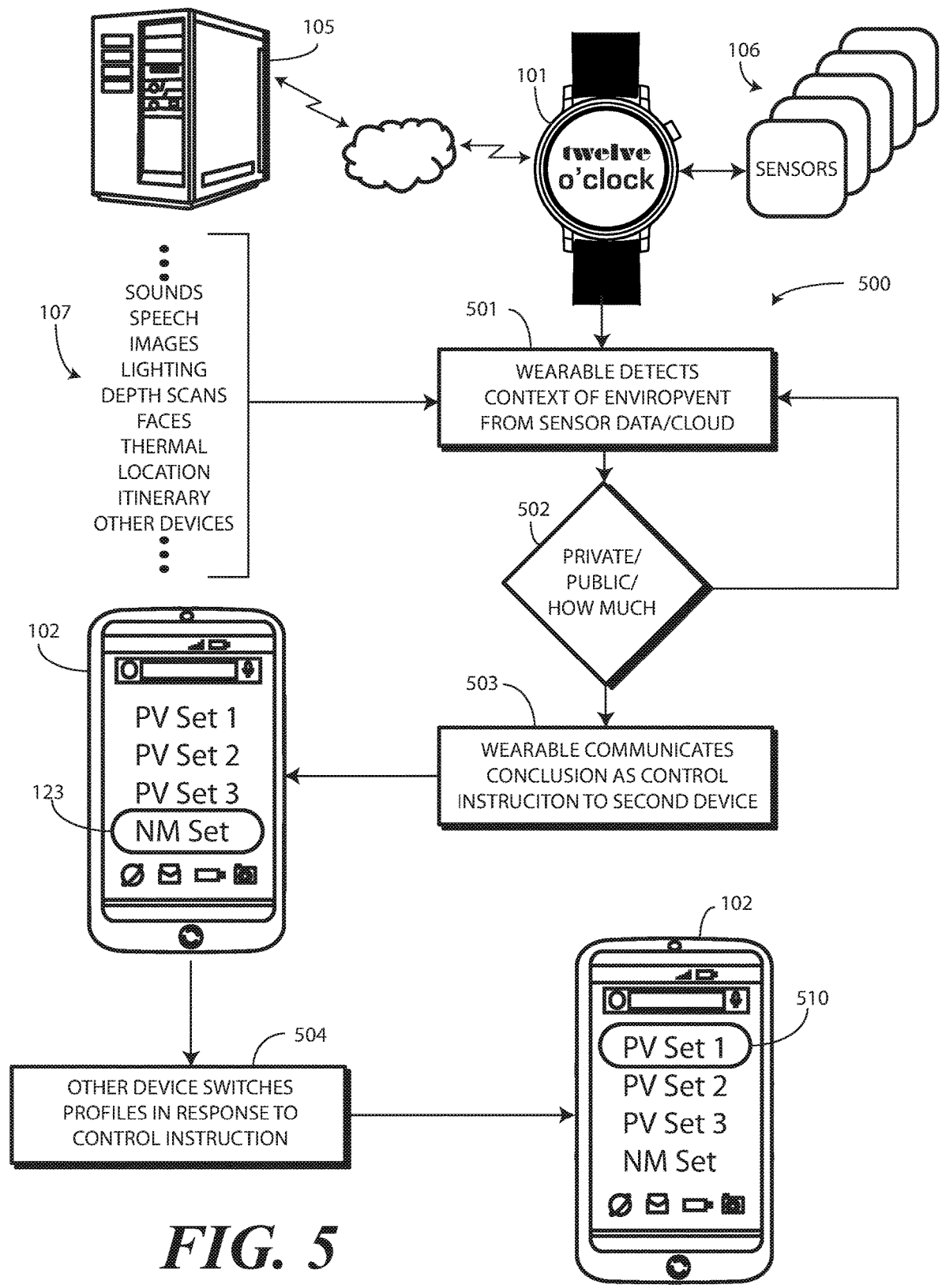
FIG. 5 illustrates yet another explanatory system and method in accordance with one or more embodiments of the disclosure.

Turning now to FIG. 5, illustrated therein is one explanatory method 500 of determining whether an electronic device should enter a normal mode of operation 123 or a privacy mode of operation 510 in accordance with one or more embodiments of the disclosure. Initially in this method 500, a wearable electronic device 101 establishes a paired communication connection with at least one companion electronic device 102. The wearable electronic device 101 can optionally establish a communication connection with one or more cloud electronic devices 105 as well.

At step 501, one or more sensors 106 of the wearable electronic device receive sensor data 107 from an environment of the wearable electronic device 101. Examples of this sensor data 107 shown in FIG. 5 include sounds, detected speech, captured images, lighting conditions, depth scans captured with a depth imager, faces detected with an imager processing system, thermal signals such as those received by one or more proximity sensors, location information detected by a geolocator, and the presence of other devices operating within the environment. Other examples of sensor data 107 will be obvious to those of ordinary skill in the art having the benefit of this disclosure.

In one or more embodiments, step 501 further comprises receiving audio input in the form of speech, and examining the content and context of the speech to determine whether privacy is required. If, for example, a person is discussing a medical procedure with another person, a privacy mode of operation may be appropriate.

At decision 502, one or more processors of the wearable electronic device 101 determine, from the sensor data 107, whether the wearable electronic device 101 should enter a privacy mode of operation or a normal mode of operation. In one or more embodiments, the wearable electronic device 101 should enter the privacy mode of operation when the environment is determined to be a public environment or to include a public setting. In one or more embodiments, the wearable electronic device 101 should enter the normal mode of operation when the environment is determined to be a private environment or include a public setting. In one or more embodiments, the private environment occurs when only one person is within the predefined environment, while the public environment occurs when two or more persons are within the predefined environment. Other conditions for determining whether the environment is public or private will be obvious to those of ordinary skill in the art having the benefit of this disclosure.

At step 503, the one or more processors of the wearable electronic device 101 cause the wireless communication circuit transmit one or more electronic communications to the companion electronic device 102. In one or more embodiments, the one or more processors of the wearable electronic device 101 further cause the wireless communication circuit to transmit at least some of the sensor data 107 to the companion electronic device 102.

In one or more embodiments, the one or more electronic communications transmitted at step 503 comprise a control command requiring the companion electronic device 102 to enter either a privacy mode of operation or a normal mode of operation. In one or more embodiments, the one or more electronic communications transmitted at step 503 comprise a conclusion identifying whether the environment is a public environment or a private environment. In one or more embodiments, where a privacy mode of operation is required and the privacy mode of operation comprises one privacy mode of operation selected from a plurality of privacy modes of operation, with each privacy mode of operation of the plurality of privacy modes of operation allowing access to different amounts of the user data, the one or more electronic communications transmitted at step 503 can comprise an instruction identifying which privacy mode of operation of the plurality of privacy modes should be selected.

The companion electronic device 102 then receives, with a communication device, the one or more electronic communications sent at step 503. At step 504, the companion electronic device executes, with one or more processors operable with the communication device, a decision operation. In one or more embodiments, the decision operation of step 504 uses data from the one or more electronic communications as inputs.

In one or more embodiments, the decision operation of step 504 determines whether the companion electronic device 102 is in a public setting or a private setting. Where the one or more electronic communications transmitted at step 503 comprise a control command requiring the companion electronic device 102 to enter either a privacy mode of operation or a normal mode of operation, the decision operation of step 504 can comprise obtaining the control command or another instruction from the one or more electronic communications requiring the one or more processors to cause the electronic device to enter the privacy mode of operation or the normal mode of operation.

In one or more embodiments, step 504 executing a selection operation using the data from the one or more electronic communications as the inputs. In one or more embodiments, the selection operation of step 504 selects the privacy mode of operation from a plurality of privacy modes of operation. For example, where the one or more electronic communications transmitted at step 503 comprise an instruction identifying which privacy mode of operation of the plurality of privacy modes should be selected, step 504 can comprise reading the instruction to make the selection.

Where step 504 reveals that the companion electronic device is in the private setting, the one or more processors of the companion electronic device 102 cause the companion electronic device 102 to enter a normal mode of operation 123. By contrast, as shown in FIG. 5, where step 504 reveals that the companion electronic device is in the public setting, the one or more processors of the companion electronic device 102 cause the companion electronic device 102 to enter a privacy mode of operation 510.

Figure 6:
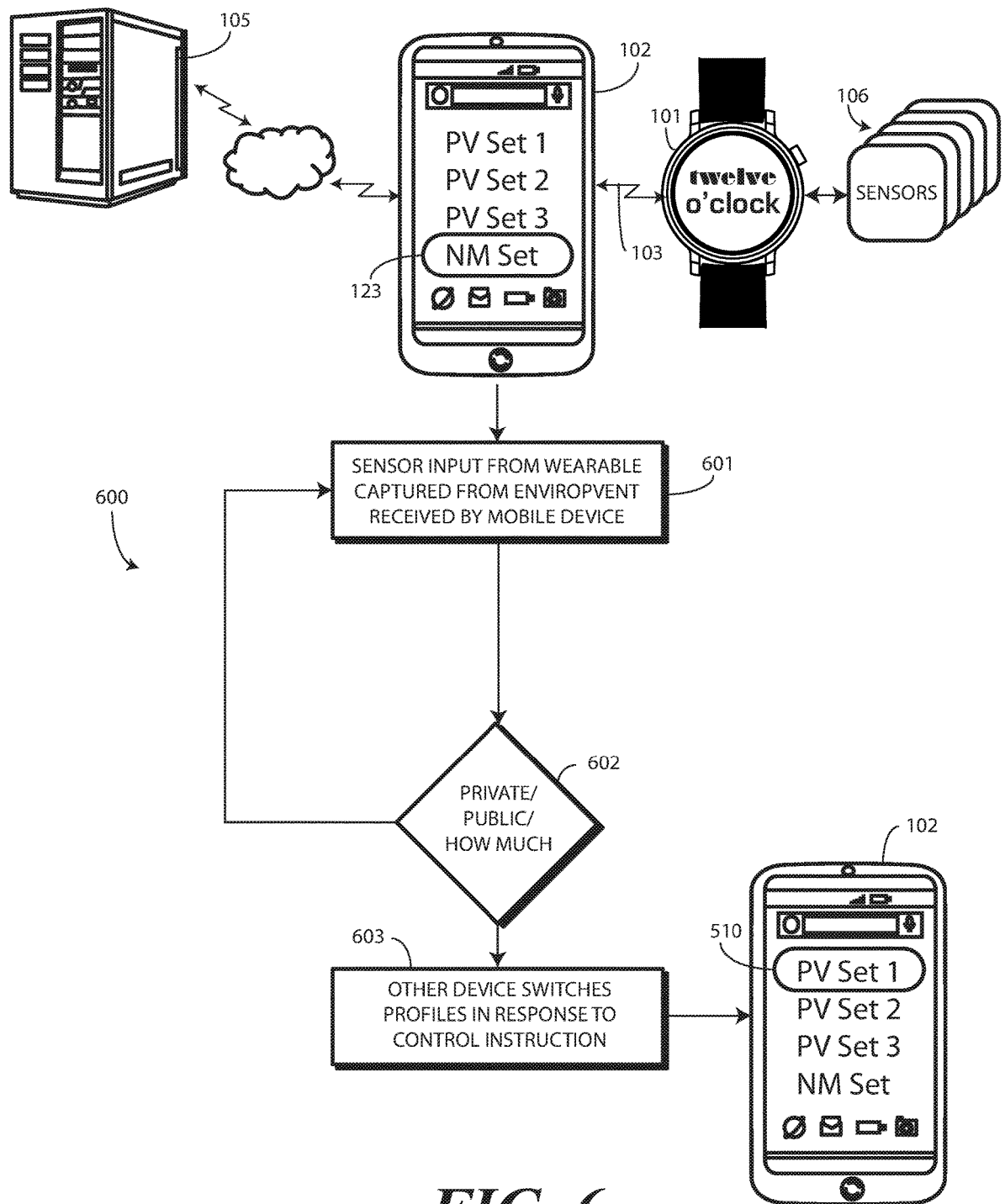
FIG. 6 illustrates another system and method in accordance with one or more embodiments of the disclosure.

Turning now to FIG. 6, illustrated therein is another explanatory method 600 of determining whether an electronic device should enter a normal mode of operation 123 or a privacy mode of operation 510 in accordance with one or more embodiments of the disclosure. Initially, a companion electronic device 102 establishes a paired communication connection 103 with a wearable electronic device 101. The companion electronic device 102 can optionally establish another communication connection to one or more cloud electronic devices 105.

One or more sensors 106 of the wearable electronic device 101 receive sensor data from an environment of the wearable electronic device 101. At step 601, the companion electronic device 102 receives, with a communication device, one or more electronic communications from the wearable electronic device 101. In one or more embodiments, the one or more electronic communications received at step 601 comprise the sensor data received by the one or more sensors 106 of the wearable electronic device 101 from the environment. Where the companion electronic device 102 also includes one or more sensors, step 601 can include capturing, with one or more sensors, sensor data from an environment of the electronic device.

At decision 602, one or more processors of the companion electronic device 102 determine, from the one or more electronic communications, whether the environment is a public environment or a private environment. In one or more embodiments, decision 602 comprises one or more processors of the companion electronic device 102 executing a decision operation using data from the one or more received electronic communications as inputs to determine whether the electronic device is in a public setting or a private setting.

At step 604, the companion electronic device 102 switches the operating mode to a mode decided at decision 602. Where the environment is a private environment, step 604 causes the user interface of the companion electronic device 102 to enter a normal mode of operation 123. However, where the environment is a public environment, step 604 causes the user interface of the companion electronic device 102 to enter a privacy mode of operation. Said differently, where the companion electronic device 102 is in a private setting, step 604 causes the electronic device to enter a normal mode of operation. Where the companion electronic device 102 is in a public setting, step 604 causes the electronic device to enter a privacy mode of operation.

Figure 7:
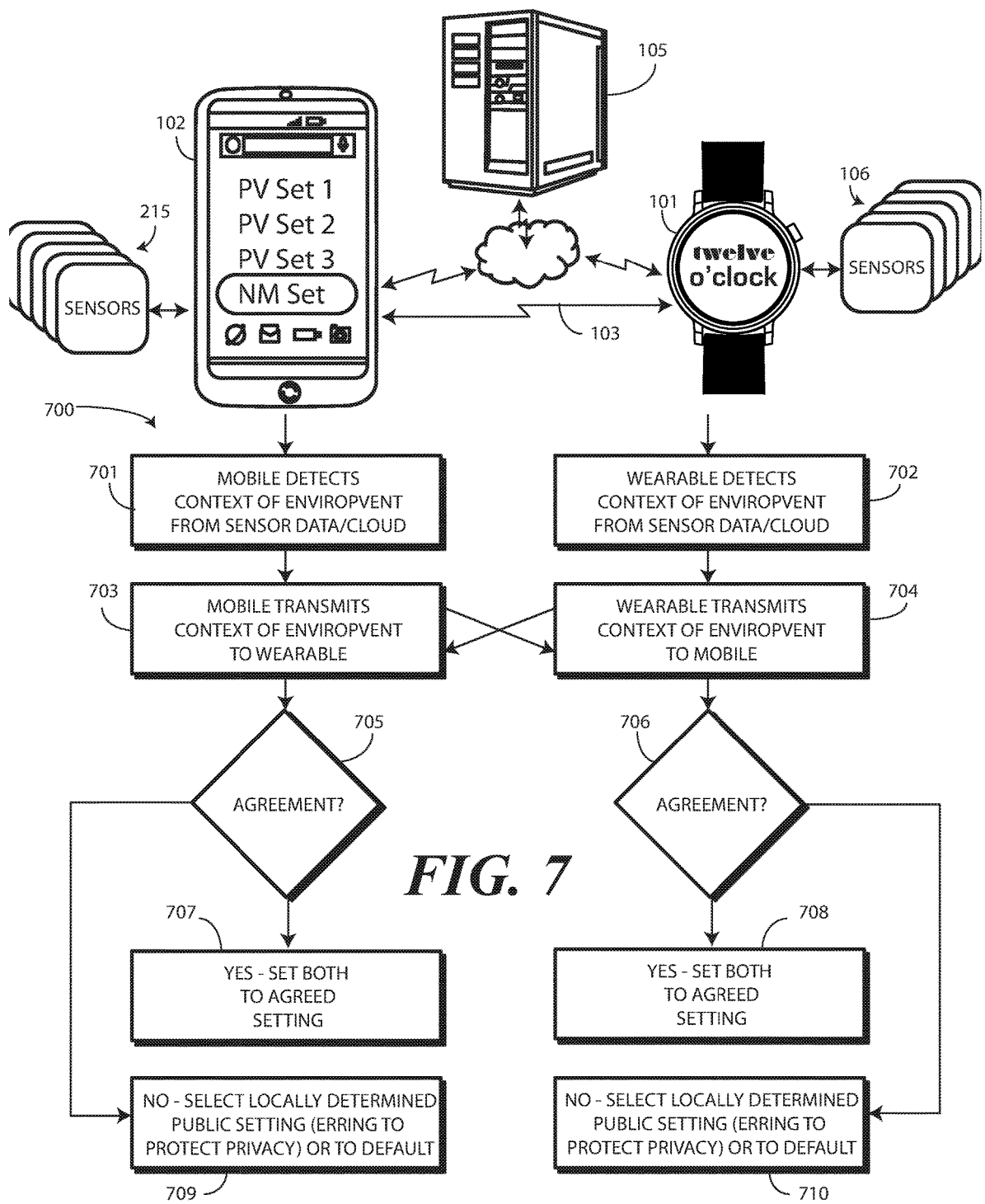
FIG. 7 illustrates another system and method in accordance with one or more embodiments of the disclosure.

Turning now to FIG. 7, illustrated therein is yet another explanatory method 700 of determining whether an electronic device should enter a normal mode of operation or a privacy mode of operation in accordance with one or more embodiments of the disclosure. Initially, a companion electronic device 102 establishes a paired communication connection 103 with a wearable electronic device 101. The companion electronic device 102 and wearable electronic device 101 can optionally establish another communication connection to one or more cloud electronic devices 105.

One or more sensors 106 of the wearable electronic device 101 receive sensor data from an environment of the wearable electronic device 101. One or more sensors 215 of the companion electronic device 102 also receive sensor data from the environment. The wearable electronic device 101 and the companion electronic device 102 can optionally exchange captured sensor data on the paired communication connection 103.

At step 701, one or more processors of the companion electronic device 102 determine, from the captured sensor data and/or the sensor data received from the wearable electronic device 101, whether the environment around the companion electronic device 102 is public or private. In one or more embodiments, step 701 comprises determining a conclusion regarding whether the environment around the companion electronic device 102 is public or private.

At step 702, one or more processors of the wearable electronic device 101 determine, from the captured sensor data and/or the sensor data received from the companion electronic device 102, whether the environment around the wearable electronic device 101 is public or private. In one or more embodiments, step 702 comprises determining a conclusion regarding whether the environment around the wearable electronic device 101 is public or private.

At step 703, the companion electronic device 102 transmits its conclusion to the wearable electronic device 101. At step 704, the wearable electronic device 101 transmits its conclusion to the companion electronic device 102.

At decision 705, the one or more processors of the companion electronic device 102 compare the conclusion reached locally with that received from the wearable electronic device 101. In one or more embodiments, step 707 comprises the one or more processors causing a user interface of the companion electronic device 102 to enter a normal mode of operation only where the locally determined conclusion and the conclusion received from the wearable electronic device 101 substantially match.

Otherwise, step 709 comprises the one or more processors causing a user interface of the companion electronic device 102 to enter a privacy mode of operation when the locally determined conclusion and the conclusion received from the wearable electronic device 101 fail to substantially match in one or more embodiments. In one or more embodiments, step 709 comprises executing a selection operation using the sensor data from the one or more sensors to select the privacy mode of operation from a plurality of privacy modes of operation when the locally determined conclusion and the conclusion received from the wearable electronic device 101 fail to substantially match.

At decision 706, the one or more processors of the wearable electronic device 101 compare the conclusion reached locally with that received from the companion electronic device 102. In one or more embodiments, step 708 comprises the one or more processors causing a user interface of the wearable electronic device 101 to enter a normal mode of operation only where the locally determined conclusion and the conclusion received from the companion electronic device 102 substantially match.

Otherwise, step 710 comprises the one or more processors causing a user interface of the wearable electronic device 101 to enter a privacy mode of operation when the locally determined conclusion and the conclusion received from the companion electronic device 102 fail to substantially match in one or more embodiments. In one or more embodiments, step 710 comprises executing a selection operation using the sensor data from the one or more sensors to select the privacy mode of operation from a plurality of privacy modes of operation when the locally determined conclusion and the conclusion received from the companion electronic device 102 fail to substantially match.

Figure 8:
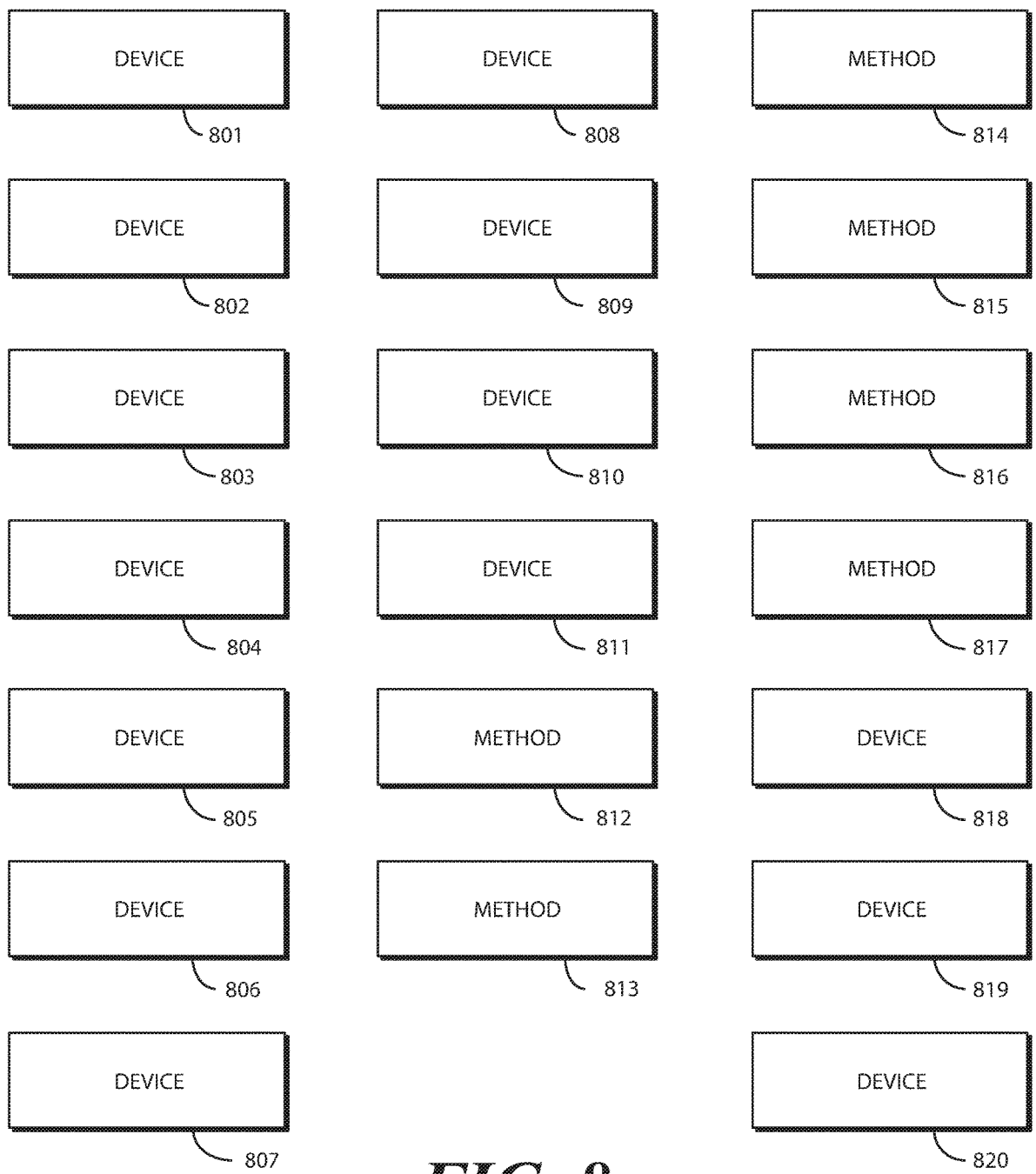
FIG. 8 illustrates various embodiments of the disclosure.

Turning now to FIG. 8, illustrated therein are various embodiments of the disclosure. At 801, an electronic device comprises a user interface. At 801, the electronic device comprises a wireless communication device establishing a paired communication connection with at least one companion electronic device. At 801, the electronic device comprises one or more processors operable with the user interface and the wireless communication device.

At 801, the wireless communication device receives one or more electronic communications from the at least one companion electronic device. At 801, the one or more processors determine, from the one or more electronic communications, whether an environment of the electronic device is a public environment or a private environment.

At 801, and where the predefined environment is the private environment, the one or more processor cause the user interface of the electronic device to enter a normal mode of operation. At 801, and where the predefined environment is the public environment, the one or more processor cause the user interface of the electronic device to enter a privacy mode of operation.

At 802, the one or more electronic communications of 801 comprise a control command requiring the one or more processors to enter the privacy mode of operation. At 803, the electronic device of 802 further comprises a memory storing user data. At 803, the privacy mode of operation comprises one privacy mode of operation selected from a plurality of privacy modes of operation. At 803, each privacy mode of operation of the plurality of privacy modes of operation allows access to different amounts of the user data. At 803, the one or more electronic communications instruct the one or more processors which privacy mode of operation of the plurality of privacy modes of operation to enter.

At 804, the one or more electronic communications of 801 comprise sensor data received by one or more sensors of the companion electronic device from the predefined environment. At 805, the electronic device of 804 further comprises one or more other sensors receiving other sensor data from the predefined environment. At 805, the one or more processors determining whether the predefined environment is the public environment or the private environment from a combination of the sensor data and the other sensor data.

At 806, the electronic device of 805 further comprises a memory storing user data. At 806, the privacy mode of operation comprises one privacy mode of operation selected from a plurality of privacy modes of operation. At 806, each privacy mode of operation of the plurality of privacy modes of operation allows access to different amounts of the user data. At 806, the one or more processors select the privacy mode of operation as a function of the combination of the sensor data and the other sensor data. At 807, the one or more electronic communications of 801 comprise data received from a cloud computing device.

At 808, the one or more electronic communications of 801 comprise a conclusion identifying whether the predefined environment is the public environment or the private environment. At 809, the electronic device of 808 further comprises one or more other sensors receiving other sensor data from the predefined environment. At 809, the one or more processors also determine, from the one or more other sensors as another conclusion, whether the predefined environment is the public environment or the private environment. At 809, the one or more processors enter the normal mode of operation only when the conclusion and the other conclusion substantially match.

At 810, the electronic device of 809 further comprises a memory storing user data. At 810, the privacy mode of operation comprises one privacy mode of operation selected from a plurality of privacy modes of operation. At 810, each privacy mode of operation of the plurality of privacy modes of operation allows access to different amounts of the user data.

At 811, the private environment of 801 occurs when only one person is within the predefined environment. At 811, the public environment of 801 occurs when two or more persons are within the predefined environment.

At 812, a method in an electronic device comprises receiving, with a communication device, one or more electronic communications from a companion electronic device. At 812, the method comprises executing, with one or more processors operable with the communication device, a decision operation using data from the one or more electronic communications as inputs. At 812, the decision operation determines whether the electronic device is in a public setting or a private setting.

At 812, and where the electronic device is in the private setting, one or more processors cause the electronic device to enter a normal mode of operation. At 812, and where the electronic device is in the public setting, the one or more processors cause the electronic device to enter a privacy mode of operation.

At 813, the decision operation of 812 comprises obtaining an instruction from the one or more electronic communications requiring the one or more processors to cause the electronic device to enter the privacy mode of operation. At 814, the method of 813 further comprises executing a selection operation using the data from the one or more electronic communications as the inputs. At 814, the selection operation selects the privacy mode of operation from a plurality of privacy modes of operation.

At 815, the method of 812 comprises capturing, with one or more sensors of the electronic device, sensor data from an environment of the electronic device. At 815, the decision operation uses both the data from the one or more electronic communications and the sensor data from the one or more sensors as the inputs.

At 816, the method of 812 further comprises capturing, with one or more sensors of the electronic device, sensor data from an environment of the electronic device. At 816, the method comprises determining, with the one or more processors, a conclusion identifying whether the electronic device is in the public setting or the private setting. At 816, the one or more electronic communications comprise another conclusion identifying whether the electronic device is in the public setting or the private setting.

At 816, the one or more processors cause the electronic device to enter the public mode of operation only when the conclusion and the other conclusion substantially match. At 817, the one or more processors of 816 execute a selection operation using the sensor data from the one or more sensors to select the privacy mode of operation from a plurality of privacy modes of operation when the conclusion and the other conclusion fail to substantially match.

At 818, an electronic device comprises a wireless communication device establishing a paired communication connection with at least one companion electronic device. At 818, the electronic device comprises one or more sensors receiving sensor data from an environment of the electronic device. At 818, the electronic device comprises one or more processors operable with the wireless communication device and the one or more sensors.

At 818, the one or more processors determine, from the sensor data, whether the electronic device should enter a privacy mode of operation or a public mode of operation. At 818, and when the electronic device should enter the privacy mode of operation, the one or more processors cause the wireless communication device to transmit one or more electronic communications to the companion electronic device instructing the electronic device to enter the privacy mode of operation.

At 819, the one or more processors of 818 further cause the wireless communication device to transmit at least some of the sensor data to the companion electronic device. At 820, the one or more sensors of 818 comprise an audio input receiving speech signals from the environment. At 820, the one or more processors determine whether the electronic device should enter the privacy mode of operation or the public mode of operation from the speech signals.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a user interface;
   a wireless communication device establishing a paired communication connection with at least one companion electronic device;
   one or more processors operable with the user interface and the wireless communication device; and
   one or more sensors receiving sensor data from an environment of the electronic device;
   the wireless communication device receiving one or more electronic communications from the at least one companion electronic device, the one or more electronic communications comprising a conclusion identifying whether the environment is a public environment or a private environment;
   the one or more processors determining, from the one or more electronic communications, whether the environment of the electronic device is the public environment or the private environment;
   the one or more processors also determining, from the one or more sensors as another conclusion, whether the environment is the public environment or the private environment; and
   where the environment is the private environment, and only when the conclusion and the another conclusion substantially match, causing, by the one or more processors, the user interface of the electronic device to enter a normal mode of operation; and
   where the environment is the public environment, causing, by the one or more processors, the user interface of the electronic device to enter a privacy mode of operation.

2. The electronic device of claim 1, the one or more electronic communications comprising a control command requiring the one or more processors to enter the privacy mode of operation.

3. The electronic device of claim 2, the electronic device further comprising a memory storing user data, the privacy mode of operation comprising one privacy mode of operation selected from a plurality of privacy modes of operation, with each privacy mode of operation of the plurality of privacy modes of operation allowing access to different amounts of the user data, the one or more electronic communications instructing the one or more processors which privacy mode of operation of the plurality of privacy modes of operation to enter.

4. The electronic device of claim 1, the one or more electronic communications comprising sensor data received by one or more sensors of the companion electronic device from the environment.

5. The electronic device of claim 4, the electronic device further comprising one or more other sensors receiving other sensor data from the environment, the one or more processors determining whether the environment is the public environment or the private environment from a combination of the sensor data and the other sensor data.

6. The electronic device of claim 5, the electronic device further comprising a memory storing user data, the privacy mode of operation comprising one privacy mode of operation selected from a plurality of privacy modes of operation, with each privacy mode of operation of the plurality of privacy modes of operation allowing access to different amounts of the user data, the one or more processors selecting the privacy mode of operation as a function of the combination of the sensor data and the other sensor data.

7. The electronic device of claim 1, the one or more electronic communications comprising data received from a cloud computing device.

8. The electronic device of claim 1, the privacy mode of operation selected from a plurality of privacy modes of operation.

9. The electronic device of claim 8, the one or more electronic communications instructing the one or more processors which one of the plurality of privacy modes of operation to enter.

10. The electronic device of claim 1, the electronic device further comprising a memory storing user data, the privacy mode of operation comprising one privacy mode of operation selected from a plurality of privacy modes of operation, each privacy mode of operation of the plurality of privacy modes of operation allowing access to different amounts of the user data.

11. The electronic device of claim 1, the private environment occurring when only one person is within the environment, the public environment occurring when two or more persons are within the environment.

12. A method in an electronic device, the method comprising:
   receiving, with a communication device, one or more electronic communications from a companion electronic device, the electronic communications comprising a conclusion identifying whether the electronic device is in a private setting or a public setting;
   capturing, with one or more sensors of the electronic device, sensor data from an environment of the electronic device;
   determining, with one or more processors operable with the communication device and the one or more sensors, another conclusion identifying whether the electronic device is in the private setting or the public setting; and
   executing, with the one or more processors, a decision operation using data from the one or more electronic communications as inputs, the decision operation determining whether the electronic device is in a public setting or a private setting; and
   where the electronic device is in the private setting, and only when the conclusion and the another conclusion match, causing, with the one or more processors, the electronic device to enter a normal mode of operation; and
   where the electronic device is in the public setting, causing, by the one or more processors, the electronic device to enter a privacy mode of operation.

13. The method of claim 12, the decision operation comprising obtaining an instruction from the one or more electronic communications requiring the one or more processors to cause the electronic device to enter the privacy mode of operation.

14. The method of claim 13, further comprising executing a selection operation using the data from the one or more electronic communications as the inputs, the selection operation selecting the privacy mode of operation from a plurality of privacy modes of operation.

15. The method of claim 12, further comprising capturing, with one or more sensors of the electronic device, sensor data from an environment of the electronic device, the decision operation using both the data from the one or more electronic communications and the sensor data from the one or more sensors as the inputs.

16. The method of claim 12, the one or more processors executing a selection operation using the sensor data from the one or more sensors to select the privacy mode of operation from a plurality of privacy modes of operation when the conclusion and the another conclusion fail to substantially match.

17. The electronic device of claim 1, the public environment occurring when two or more persons are within the environment.

18. The electronic device of claim 1, the private environment comprising a home of an authorized user of the electronic device.

19. The electronic device of claim 1, wherein a default mode of operation for the electronic device is the privacy mode of operation.

20. The electronic device of claim 1, the privacy mode of operation protecting at least some data stored within the electronic device.

* * * * *